United States Patent
Myrhum, Jr.

(10) Patent No.: US 11,708,821 B2
(45) Date of Patent: Jul. 25, 2023

(54) AXIAL PUMP ASSEMBLIES

(71) Applicant: Milwaukee Electric Tool Corporation, Brookfield, WI (US)

(72) Inventor: James O. Myrhum, Jr., West Bend, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/867,207

(22) Filed: Jul. 18, 2022

(65) Prior Publication Data

US 2022/0349393 A1    Nov. 3, 2022

Related U.S. Application Data

(62) Division of application No. 16/931,637, filed on Jul. 17, 2020, now Pat. No. 11,421,665.

(60) Provisional application No. 62/875,069, filed on Jul. 17, 2019.

(51) Int. Cl.
*F04B 1/043* (2020.01)
*F04B 1/0413* (2020.01)

(52) U.S. Cl.
CPC ............ *F04B 1/043* (2013.01); *F04B 1/0413* (2013.01)

(58) Field of Classification Search
USPC ............................................................. 92/70
See application file for complete search history.

(56) References Cited

U.S. PATENT DOCUMENTS

| | | | | |
|---|---|---|---|---|
| 2,205,953 A | * | 6/1940 | Hall | F16H 25/12 74/56 |
| 2,401,794 A | * | 6/1946 | Pratt | B25D 11/104 74/56 |
| 2,928,289 A | * | 3/1960 | Maroth | F16H 25/20 74/425 |
| 3,343,424 A | * | 9/1967 | Green | F16H 43/00 74/25 |
| 3,760,676 A | * | 9/1973 | Daniels | B21D 28/002 83/590 |
| 3,841,165 A | * | 10/1974 | Layfield | F16H 25/12 74/56 |
| 5,028,217 A | * | 7/1991 | Miller | F16H 25/12 74/424.89 |
| 5,472,322 A | * | 12/1995 | Huet | F04B 1/12 417/415 |
| 7,814,827 B2 | | 10/2010 | Frenken et al. | |

(Continued)

FOREIGN PATENT DOCUMENTS

CN    202997812 U    6/2013
EP    1921346 A1    5/2008
(Continued)

*Primary Examiner* — Essama Omgba
*Assistant Examiner* — Geoffrey S Lee
(74) *Attorney, Agent, or Firm* — Quarles & Brady LLP

(57) ABSTRACT

Embodiments of the invention provide a pump assembly for a hydraulic tool. The pump assembly can include a reciprocating element that is configured to move between a retracted position and an extended position, a cam surface in the reciprocating element that can engage cam followers, a rotating element that can receive rotational input, and a base that can at least partially surrounds the rotating element. Movement of the cam followers along the cam surface can move the reciprocating element from the retracted position to the extended position.

6 Claims, 21 Drawing Sheets

(56) References Cited

U.S. PATENT DOCUMENTS

| | | |
|---|---|---|
| 8,251,157 B2 | 8/2012 | Gray et al. |
| 8,266,991 B2 | 9/2012 | Thorson et al. |
| 8,276,430 B2 | 10/2012 | Barezzani et al. |
| 8,683,704 B2 | 4/2014 | Scott et al. |
| 8,763,257 B2 | 7/2014 | Thorson et al. |
| 8,851,200 B2 | 10/2014 | Gray et al. |
| 8,875,404 B2 | 11/2014 | Scott et al. |
| 9,016,317 B2 | 4/2015 | Myrhum, Jr. |
| 9,196,881 B2 | 11/2015 | Gray et al. |
| 9,302,402 B2 | 4/2016 | Thorson et al. |
| 9,484,700 B2 | 11/2016 | Kehoe |
| 9,486,864 B2 | 11/2016 | Luo et al. |
| 9,486,865 B2 | 11/2016 | Scott et al. |
| 9,669,533 B2 | 6/2017 | Myrhum, Jr. |
| 9,808,851 B2 | 11/2017 | Thorson et al. |
| D805,365 S | 12/2017 | Ballard et al. |
| 10,046,470 B2 | 8/2018 | Thorson et al. |
| 10,093,012 B2 | 10/2018 | Koski et al. |
| 10,128,723 B2 | 11/2018 | Mergener et al. |
| 10,213,821 B2 | 2/2019 | Thorson et al. |
| 10,226,826 B2 | 3/2019 | Kehoe et al. |
| 10,265,758 B2 | 4/2019 | Skinner et al. |
| 10,270,263 B2 | 4/2019 | Brozek |
| 10,312,653 B2 | 6/2019 | Ballard et al. |
| 10,339,496 B2 | 7/2019 | Matson et al. |
| 10,343,266 B2 | 7/2019 | Theiler et al. |
| 10,380,883 B2 | 8/2019 | Matson et al. |
| 10,428,843 B2 | 10/2019 | Ballard et al. |
| 10,498,195 B2 | 12/2019 | Mergener et al. |
| 10,539,206 B2 * | 1/2020 | Bibolotti .......... F16H 1/46 |
| 10,618,151 B2 | 4/2020 | Kanack et al. |
| 10,700,575 B2 | 6/2020 | Hessenberger et al. |
| 2005/0011236 A1 | 1/2005 | Frenken et al. |
| 2007/0003392 A1 | 1/2007 | Frenken et al. |
| 2008/0069663 A1 | 3/2008 | Frenken et al. |
| 2009/0229842 A1 | 9/2009 | Gray et al. |
| 2010/0000288 A1 | 1/2010 | Barezzani et al. |
| 2010/0088898 A1 | 4/2010 | Thorson et al. |
| 2010/0325894 A1 | 12/2010 | Scott et al. |
| 2011/0005083 A1 | 1/2011 | Scott et al. |
| 2011/0005084 A1 | 1/2011 | Thorson et al. |
| 2012/0318546 A1 | 12/2012 | Gray et al. |
| 2013/0008031 A1 | 1/2013 | Thorson et al. |
| 2013/0097873 A1 | 4/2013 | Luo et al. |
| 2014/0034159 A1 | 2/2014 | Myrhum, Jr. |
| 2014/0173907 A1 | 6/2014 | Scott et al. |
| 2014/0182137 A1 | 7/2014 | Liu et al. |
| 2015/0014008 A1 | 1/2015 | Gray et al. |
| 2015/0217438 A1 | 8/2015 | Myrhum, Jr. |
| 2016/0099533 A1 | 4/2016 | Kehoe |
| 2016/0214265 A1 | 7/2016 | Thorson et al. |
| 2016/0252112 A1 | 9/2016 | Kehoe et al. |
| 2016/0288193 A1 | 10/2016 | Thorson et al. |
| 2016/0329674 A1 | 11/2016 | Ballard et al. |
| 2016/0363510 A1 | 12/2016 | Kanack et al. |
| 2016/0364687 A1 | 12/2016 | Matson et al. |
| 2016/0373457 A1 | 12/2016 | Matson et al. |
| 2017/0013740 A1 | 1/2017 | Mergener et al. |
| 2017/0271893 A1 | 9/2017 | Brozek |
| 2017/0355027 A1 | 12/2017 | D'Antuono |
| 2017/0356472 A1 | 12/2017 | Ballard et al. |
| 2018/0021840 A1 | 1/2018 | Thorson et al. |
| 2018/0085903 A1 | 3/2018 | Wackwitz et al. |
| 2018/0085909 A1 | 3/2018 | Koski et al. |
| 2018/0093319 A1 | 4/2018 | Skinner et al. |
| 2018/0099388 A1 | 4/2018 | Koski et al. |
| 2018/0147618 A1 | 5/2018 | Skinner et al. |
| 2018/0281272 A1 | 10/2018 | Dickert et al. |
| 2018/0311805 A1 | 11/2018 | Koski et al. |
| 2019/0052149 A1 | 2/2019 | Mergener et al. |
| 2019/0151967 A1 | 5/2019 | Kehoe et al. |
| 2019/0156278 A1 | 5/2019 | Matson et al. |
| 2019/0176207 A1 | 6/2019 | Thorson et al. |
| 2019/0232481 A1 | 8/2019 | Skinner et al. |
| 2019/0260266 A1 | 8/2019 | Hessenberger et al. |
| 2019/0318616 A1 | 10/2019 | Matson et al. |
| 2020/0001446 A1 | 1/2020 | Ballard et al. |
| 2020/0055130 A1 | 2/2020 | D'Antuono et al. |
| 2020/0061854 A1 | 2/2020 | D'Antuono |
| 2020/0070262 A1 | 3/2020 | D'Antuono |
| 2020/0070263 A1 | 3/2020 | Olbrich |
| 2020/0147771 A1 | 5/2020 | Mergener et al. |
| 2020/0180128 A1 | 6/2020 | Schneider et al. |
| 2020/0238487 A1 | 7/2020 | Kanack et al. |
| 2020/0261959 A1 | 8/2020 | Wekwert et al. |
| 2020/0266684 A1 | 8/2020 | Hessenberger et al. |
| 2021/0017968 A1 * | 1/2021 | Myrhum, Jr. .......... F04B 9/042 |

FOREIGN PATENT DOCUMENTS

| | | |
|---|---|---|
| WO | 89/02532 A1 | 3/1989 |
| WO | 98/27364 A1 | 6/1998 |
| WO | 2015/061425 A1 | 4/2015 |

* cited by examiner

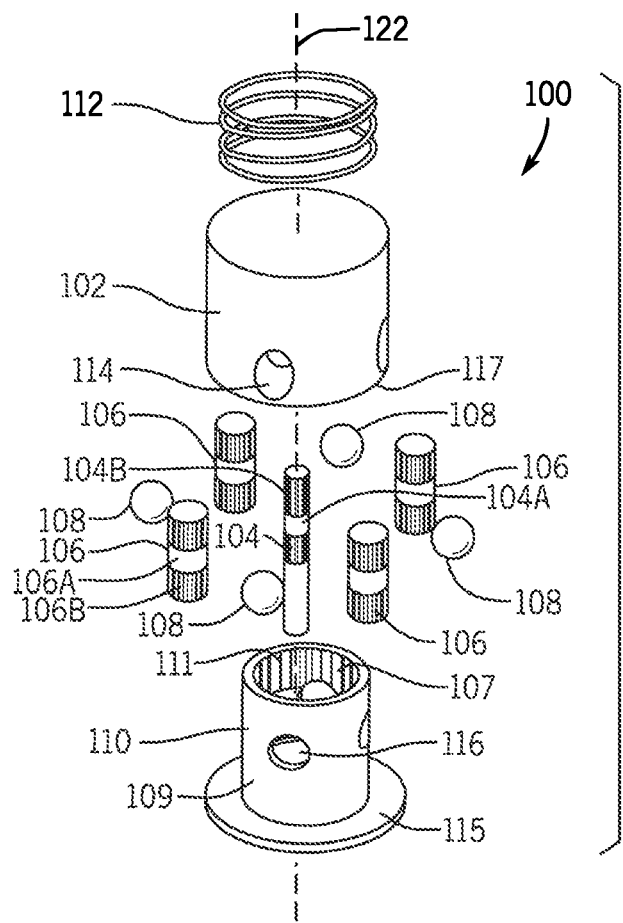
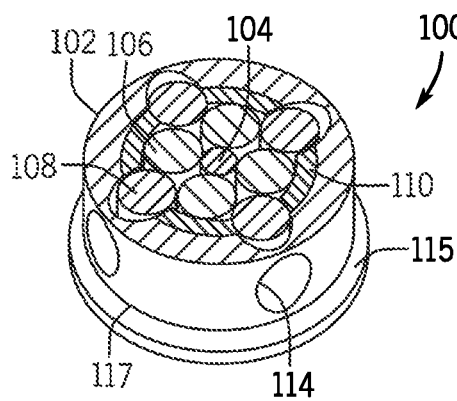
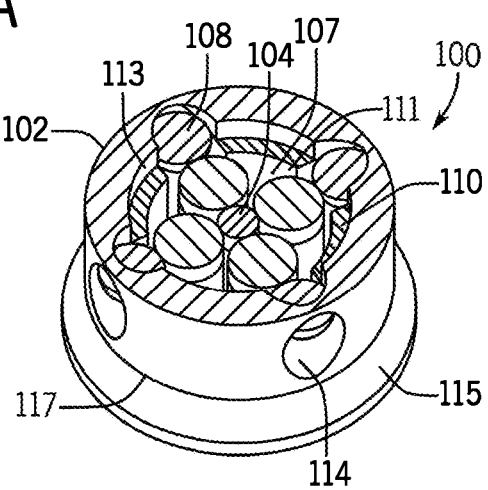
FIG. 1A
FIG. 1B
FIG. 1C

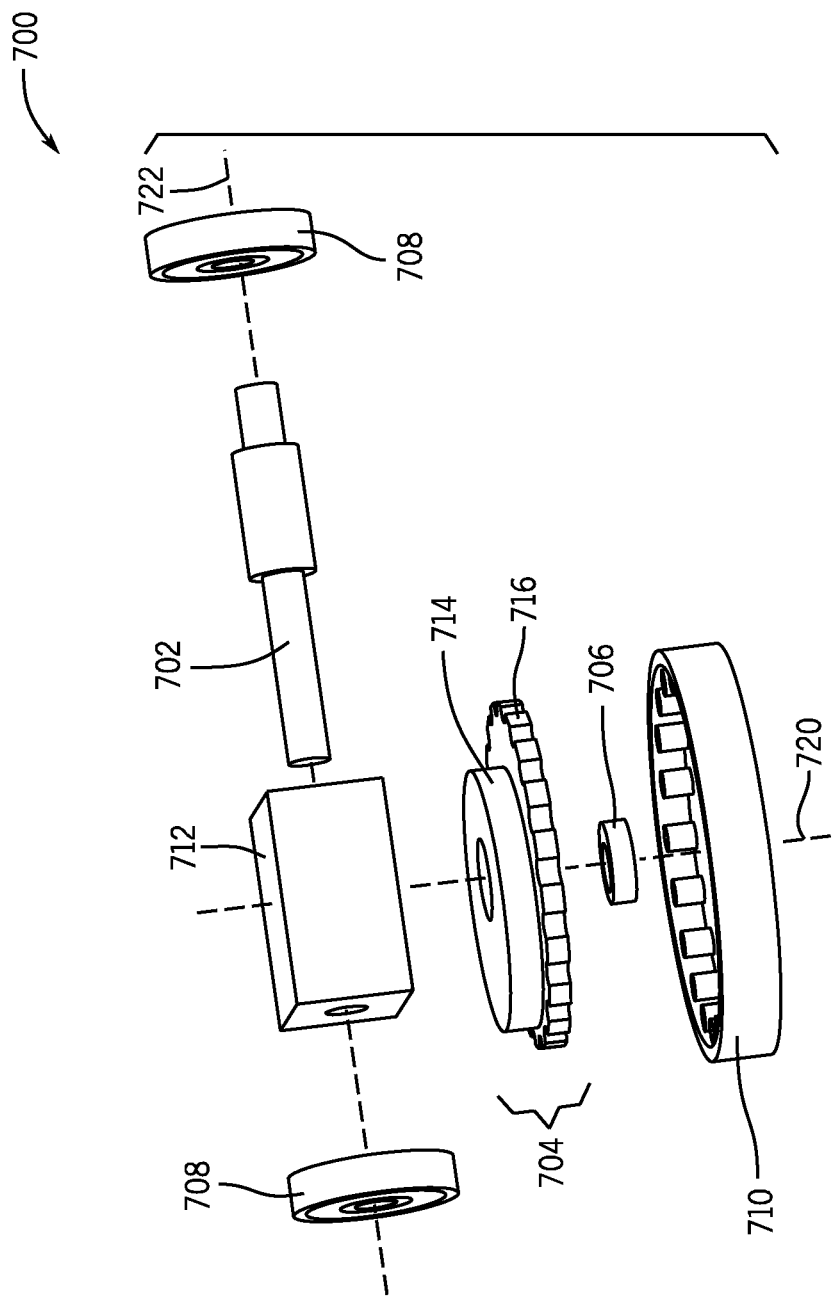

AXIAL PUMP ASSEMBLIES

RELATED APPLICATIONS

This application is a divisional of U.S. patent application Ser. No. 16/931,637, filed Jul. 17, 2020, which claims priority to U.S. Provisional Application No. 62/875,069, filed Jul. 17, 2019, both entitled "AXIAL PUMP ASSEMBLIES," the contents of which are incorporated herein by reference in their entirety.

BACKGROUND

The present disclosure relates generally to power tools. More particularly, the present disclosure relates to axial pump designs for a hydraulic power tool.

Hydraulic crimpers and cutters are different types of hydraulic power tools for performing work (e.g., crimping or cutting) on a workpiece. In such tools, a hydraulic tool comprising a hydraulic pump is utilized for pressurizing hydraulic fluid and transferring it to a cylinder in the tool. This cylinder causes an extendible piston to be displaced towards a cutting or crimping head. The piston exerts a force on the head of the power tool, which may typically include opposed jaws with certain cutting or crimping features, depending upon the particular configuration of the power tool. In this case, the force exerted by the piston may be used for closing the jaws to perform cutting or crimping on a workpiece (e.g., a wire) at a targeted location.

In some known hydraulic tools, a motor can drive the hydraulic pump by way of a gear reducer or other type of gear assembly. However, there are certain perceived disadvantages to such known hydraulic tools. For example, the motor, hydraulic pump (e.g., one or more pump pistons), and gear assembly can often be complex, heavy, and bulky, particularly in hydraulic tools that are designed for high force applications. In some cases, this can increase the cost to manufacture the hydraulic tool and might make the hydraulic tool more cumbersome for an operator to use.

Therefore, it may be useful to provide a less complex, lighter weight hydraulic tool that can be used for high force applications or lower force applications and that is also more user friendly to the operator.

SUMMARY

Embodiments of the invention provide a pump assembly for a hydraulic tool. In one embodiment, the pump assembly includes a reciprocating element that is configured to move between a retracted position and an extended position, a cam surface in the reciprocating element engages cam followers, a rotating element receives rotational input, and a base at least partially surrounds the rotating element. Movement of the cam followers along the cam surface moves the reciprocating element from the retracted position to the extended position.

In some embodiments, an axial pump assembly includes a reciprocating block having ramped radial channels extending radially outward from an inner circumferential surface of the reciprocating block, a sun driver configured to be operatively coupled to a motor shaft, ball elements configured to roll on a race portion, each ball element arranged at least partially within a respective ramped radial channel of the ramped radial channels, and a base at least partially enclosing the sun driver and the ball elements. Movement of the ball elements radially outward through the ramped radial channels drives the reciprocating block away from the base. Movement of the ball elements radially inward through the ramped radial channels drives the reciprocating block toward the base.

In some embodiments, an axial pump assembly includes a pump piston, a pair of cam follower bearings coupled to opposite ends of the pump piston, an eccentric bearing configured to drive cycloidal transmission of the pump piston, a base, and a cycloidal disk configured to be operatively coupled to a motor shaft of the hydraulic tool by way of the eccentric bearing, the cycloidal disk including a second-stage cam portion configured to transmit rotational motion to axial displacement of the pump piston. Rotation of the cycloidal disk and the second-stage cam portion pushes the pair of cam follower bearings and causes reciprocating motion of the pump piston between an extended position and a retracted position.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 1A illustrates an exploded view of an axial pump assembly according to one embodiment of the invention.

FIG. 1B is a cross-sectional top-down view of the axial pump assembly of FIG. 1A in a retracted position.

FIG. 1C is a cross-sectional top-down view of the axial pump assembly of FIG. 1A in an extended position.

FIG. 7A is an exploded view of an axial pump assembly according to another embodiment of the invention.

DETAILED DESCRIPTION

Figure 1E:
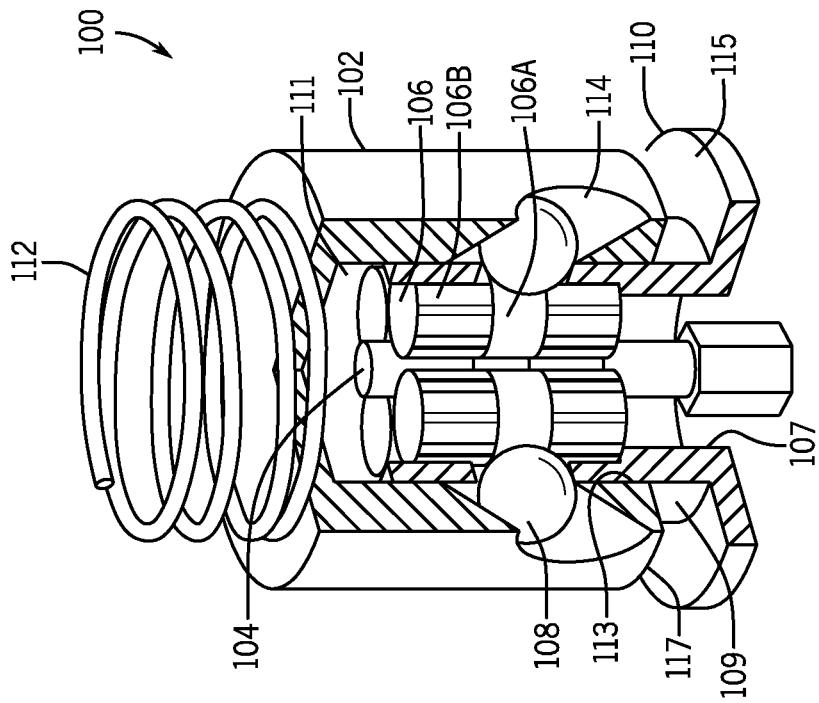
FIG. 1E is a corner-sectioned view of the axial pump assembly of FIG. 1A in the extended position.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The disclosed axial pump assembly will be described with respect to an example hydraulic tool. However, any one or more example embodiments of the disclosed axial pump assembly could be incorporated in alternate forms of a hydraulic tool. Furthermore, one or more example embodiments of the disclosed axial pump assembly could be used outside of the context of a pump system, and could more generally be used as a mechanism or mechanisms that generate/generates reciprocation.

In example embodiments, the disclosed axial pump assembly can be part of a transmission end of a hydraulic power tool. The transmission end of the hydraulic tool can include an electric motor configured to drive the axial pump assembly to cause a pump piston to reciprocate up and down. In practice, the movement of the pump piston can provide hydraulic fluid to a hydraulic fluid passage circuit. Specifically, as the pump piston moves down, hydraulic fluid can be withdrawn from a bladder or other device, and as the pump piston moves upward, the withdrawn fluid can be pressurized and delivered by way of the fluid passage circuit to a ram assembly of the hydraulic power tool, in order to drive a cutting or crimping head of the hydraulic power tool to perform a cutting or crimping action on a workpiece or other target.

In example embodiments, the axial pump assembly can include a reciprocating element, such as a block, a plate, or a disk, that can be operatively coupled to the pump piston. In an alternative arrangement, the pump piston and the reciprocating element can comprise an integral component. The axial pump assembly can also include a drive element, such as a cycloidal disk or other structure, configured to drive movement of the reciprocating element. In some embodiments, the drive element can include its own internal speed reduction, eliminating the need for a gear reducer assembly. The axial pump assembly can also include one or more ball or bearing elements arranged between the drive element and the reciprocating element so that motion and force applied to the driver causes movement of the ball or bearing elements, which in turn causes movement of the reciprocating element. The axial pump assembly can also include a base that provides a housing for one or more other components of the axial pump assembly, such as the one or more ball or bearing elements and the drive element. In some embodiments, the base can be part of or inserted into a gearbox of the transmission end of the hydraulic tool.

Each of the example embodiments of the disclosed axial pump assembly described herein generate reciprocating motion of the reciprocating element (and thus the pump piston) in a different way and provides an advantage over pump designs in existing tools. For example, the embodiments can be compact (i.e., a smaller form factor) and can reduce the quantity of components needed to achieve desired reciprocating motion. Some embodiments can include components that enable internal speed reduction, eliminating or reducing the need for an external gear reduction assembly. Additionally, in some embodiments, the reciprocating element and the drive element can be arranged, and can operate, about a common axis, and the reciprocating element and the pump piston can be substantially in line with the motor of the hydraulic tool. In other words, the axial pump assembly enables a shaft of the motor to be substantially coaxial to the line of action of the pump piston that is operatively coupled to the reciprocating element (and thus substantially coaxial to the line of action of the reciprocating element). By having components of the axial pump assembly in line with the motor, the size and complexity of the transmission end of the hydraulic tool can be reduced. In some embodiments, the pump piston can be arranged about the same common axis as the reciprocating element and the drive element. Further, in some embodiments, even more components of the axial pump assembly can be arranged about the same common axis.

Figure 1D:
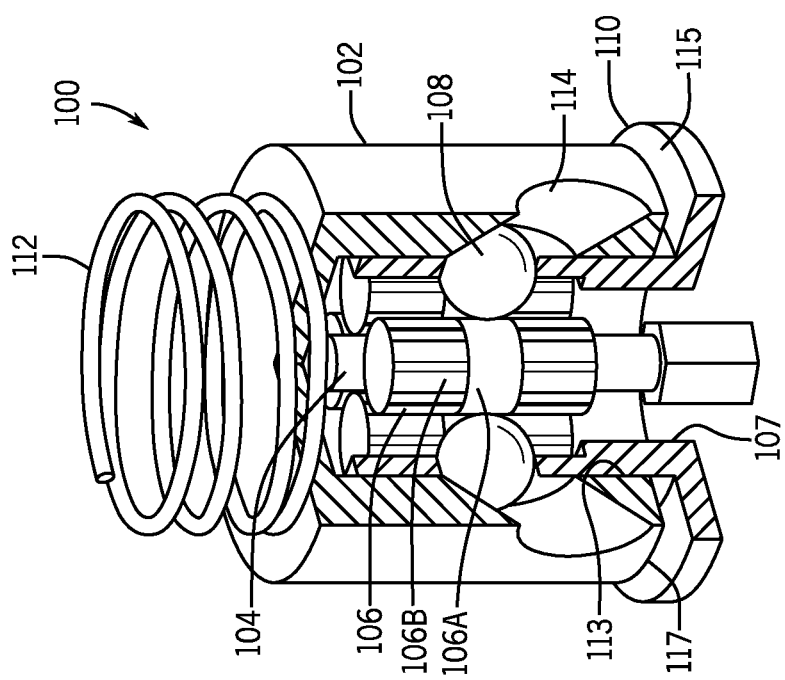
FIG. 1D is a corner-sectioned view of the axial pump assembly of FIG. 1A in the retracted position.
Figure 1F:
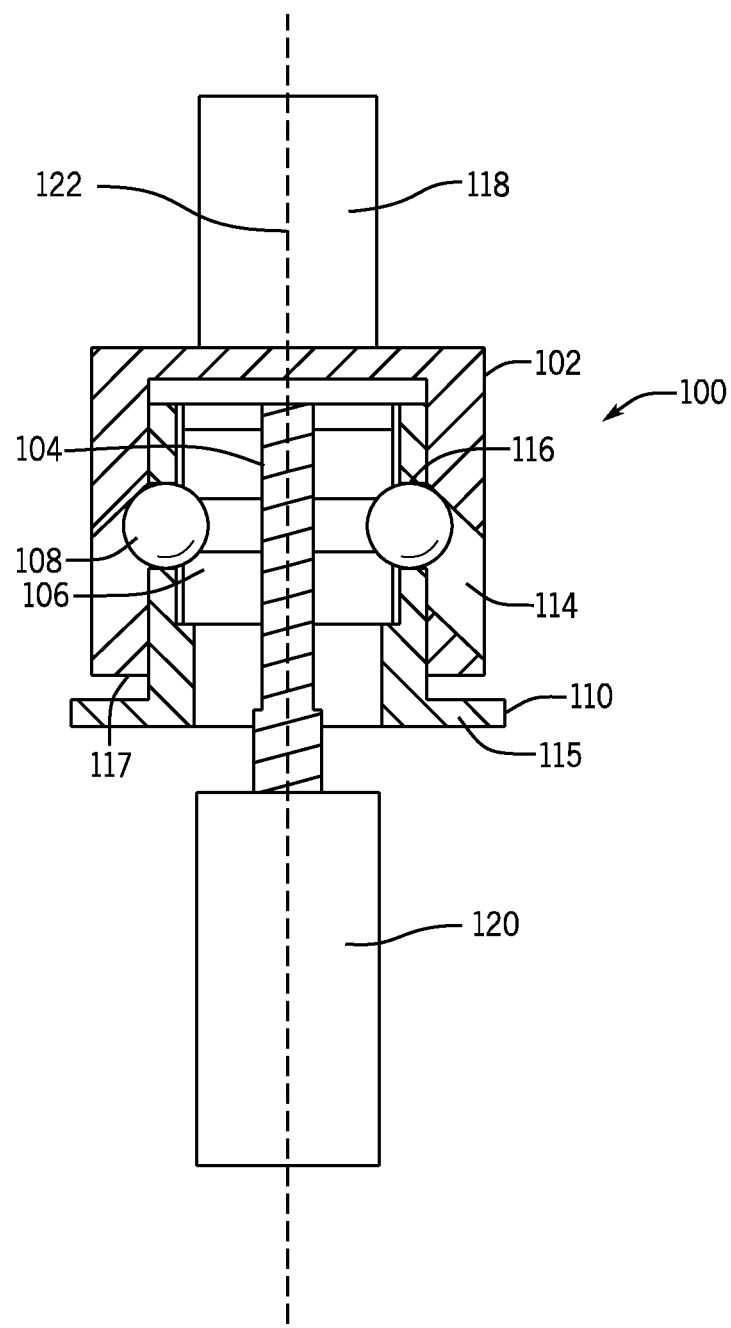
FIG. 1F is a cross-sectional side view of the axial pump assembly of FIG. 1A operatively coupled to a pump piston and a motor shaft.

FIG. 1A illustrates an axial pump assembly 100 that uses radial movement of ball elements 108 to drive a pump piston 118 (see, for example FIG. 1F). The axial pump assembly 100 includes a reciprocating block 102, a sun driver 104, planetary elements 106, ball elements 108, and a base 110. The reciprocating block 102 can be coupled to the pump piston 118 by way of a compression spring 112, where the compression spring 112 can be used to provide force to retract the axial pump assembly 100. Further, the compression spring 112 can push the axial pump assembly 100 together, helping to hold the pump assembly 100 together.

The reciprocating block 102 includes four ramped radial channels 114 that extend radially outward from an inner circumferential surface 113 of the reciprocating block 102. Each channel 114 can take the form of a through-hole or a blind hole. As a representative example, a single ramped radial channel 114 is labeled in FIG. 1A. In some examples, each channel 114 can be ramped downward (i.e., toward the base 110, rather than toward a top surface of the reciprocating block 102, as shown).

The sun driver 104 is a cylindrical-shaped element that functions as a rotational input and can be operatively coupled (e.g., pressed) directly to a shaft 120 (see, for example, FIG. 1 F) of a motor of a hydraulic tool through a bottom of the base 110. The sun driver 104 can include a race portion 104A and a geared portion 104B. The race portion 104A is a portion of the sun driver 104 on which race portions 106A of the planetary elements 106 roll. The geared portion 104B is a portion of the sun driver 104 that meshes with geared portions 106B of the planetary elements 106, creating a planetary speed reducing system. In some embodiments, the sun driver 104 does not include a race portion 104A, but the planetary elements 106 can still roll (i.e., rotate) around the sun driver 104 about a longitudinal axis 122 of the sun driver 104.

The planetary elements 106 are cylindrical-shaped elements, each having a respective race portion 106A and a respective geared portion 106B. The race portion 106A is a portion of the planetary element 106 on which the ball elements 108 roll. The geared portion 106B functions as a planetary gear for speed reduction. As noted above, the geared portions 106B of the planetary elements 106 mesh with the gear portion of the sun driver 104. The ball elements 108 can be spherical objects made of metal or another material.

The base 110 can be a housing that encircles and at least partially encloses the sun driver 104, the planetary elements 106, and the ball elements 108. Further, a cylindrical portion 109 of the base 110 can include four through-holes 116 that are each separated by a prescribed distance to space out the ball elements 108. As a representative example, a single through-hole 116 is labeled in FIG. 1A. An inner circumferential surface 107 of the base 110 can, in some embodiments, include a geared portion 111 that meshes with the geared portions 106B of the planetary elements 106 for the purposes of speed reduction. As shown, the base 110 has a peripheral flange 115 against which an end 117 of the reciprocating block 102 can rest or be adjacently positioned when the reciprocating block 102 is in a retracted position, as illustrated in FIGS. 1B and 1D, for example.

Although four ramped radial channels 114 and four ball elements 108 are shown, alternative embodiments of the axial pump assembly 100 can include more or less of the same or similar channels and ball elements. For example, some embodiments can include two ball elements and two corresponding ramped radial channels similar to the ball elements 108 and ramped radial channels 114 of the axial pump assembly 100.

In operation, the motor rotates the sun driver 104 within the cylindrical portion 109 of the base 110, causing rotation of the planetary elements 106 about the sun driver 104 (i.e., about the longitudinal axis 122 of the axial pump assembly 100). Rotation of the planetary elements 106 pushes the ball elements 108 radially outward into the ramped radial channels 114 of the reciprocating block 102. The inner circumferential surface 113 of the reciprocating block 102 surrounds the cylindrical portion 109 of the base 110. The ball elements 108 are pushed against the ramped surfaces within the channels 114 at the through-holes 116, pushing the reciprocating block 102 upwards in a direction substantially parallel to the longitudinal axis 122 and the end 117 of the reciprocating block 102 is moved away from the peripheral flange 115 of the base 110. This motion can thus push the pump piston 118 upward. Following this motion, the ball elements 108 retract radially inward within the ramped radial channels 114, toward the sun driver 104, bringing the reciprocating block 102 downwards. As arranged in the manner shown in FIG. 1A, each of the ball elements 108 can move radially outward at substantially the same time as one another, and can also retract radially inward at substantially the same time as one another. In this way, the ramped radial channels 114 act as cams and the ball elements 108 act as cam followers.

FIG. 1B is a cross-sectional top-down view of the axial pump assembly 100 in the retracted position. In the retracted position, the ball elements 108 are retracted into the ramped radial channels 114. In the retracted position, a single ball element 108 can be in contact with one or more planetary elements 106. The ball elements 108 are positioned radially inward and proximate to one end of the ramped radial channels 114 adjacent to the inner circumferential surface 113 of the block reciprocating block 102. Thus, the reciprocating block 102 is in a downward position and the end 117 of the reciprocating block 102 is adjacent to the peripheral flange 115 of the base 110. Force from the compression spring 112 can bias the axial pump assembly 100 in the retracted position.

FIG. 1C is a cross-sectional top-down view of the axial pump assembly 100 in an extended position. In the extended position, the ball elements 108 are pushed radially outward and away from the inner circumferential surface 113 of the reciprocating block 102 and into the ramped radial channels 114. In the extended position, a single ball element 108 is in contact with a single planetary element 106. As the ball elements engage the ramp of the ramped radial channels 114, the reciprocating block 102 is moved upward and the end 117 of the reciprocating block 102 is moved away from the peripheral flange 115 of the base 110. Thus, the reciprocating block 102 is in an upward, and extended position.

FIGS. 1D and 1E further illustrate the relative position of the planetary elements 106 and the ball elements 108 with respect to the ramped radial channels 114. FIG. 1D is a corner-sectioned view of the axial pump assembly 100 in the retracted position. FIG. 1E is a corner-sectioned view of the axial pump assembly 100 in the extended position.

FIG. 1F is a cross-sectional side view of the axial pump assembly 100 where the axial pump assembly 100 is operatively coupled to the pump piston 118 and the motor shaft 120. The sun driver 104 of the axial pump assembly 100 can be operatively coupled to the motor shaft 120. Although a compression spring is not illustrated in FIG. 1F, the schematic representation of the pump piston 118 can include both the compression spring 112 of FIG. 1A and the pump piston 118. Further, FIG. 1F illustrates the axial pump assembly 100, the pump piston 118, and the motor shaft 120 are arranged about the longitudinal axis 122.

An advantage of the axial pump assembly 100 is that it combines mechanisms for reciprocation and speed reduction into a single compact system. This is accomplished by combining diameters of planetary gears (i.e., planetary elements 106) as both speed reducers and cams. Another advantage of the axial pump assembly 100 is that one set of cam follower elements (i.e., ball elements 108 of FIG. 1A)

drive motion that is perpendicular to the axis of the motor shaft 120 (i.e., axis 122)—namely, the radial movement of the ball elements 108 of FIG. 1A—and also drive reciprocating motion that is in line with axis 122 (i.e., motion of the reciprocating block 102 of FIG. 1A and the pump piston 118 of FIG. 1F). Further, another advantage of the axial pump assembly 100 is that the arrangement of the axial pump assembly 100 enables the motor shaft 120 to be coaxial to the line of action of the pump piston 118, which can help provide stable motion of the pump piston 118 during operation of the hydraulic tool, as well as reduce the space taken up by the transmission end of the hydraulic tool.

In some embodiments of the axial pump assembly 100, components of the axial pump assembly 100 could be configured to reverse the relationship between the motion of the ball elements 108 and the motion of the reciprocating block 102. In particular, the axial pump assembly 100 could be configured so that movement (i.e., retraction) of the ball elements 108 radially inward extends the reciprocating block 102 and movement of the ball elements 108 radially outward retracts the reciprocating block 102. To facilitate this, the cam feature of the axial pump assembly 100 could be external to the reciprocating block 102.

Figure 2A:
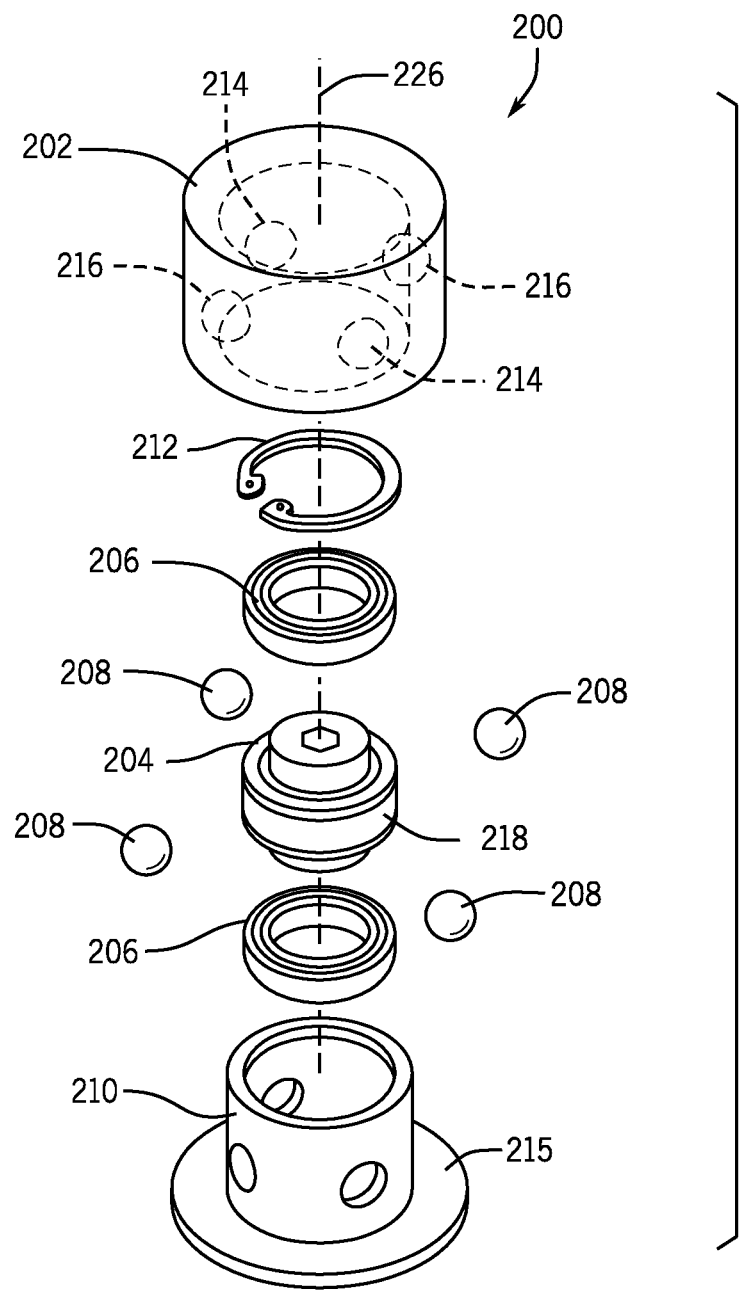
FIG. 2A is an exploded view of an axial pump assembly according to another embodiment of the invention.
Figure 2C:
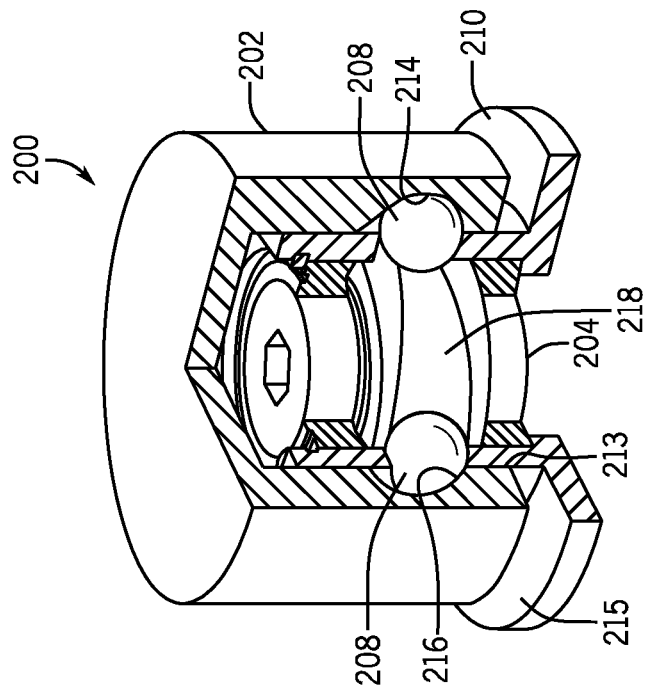
FIG. 2C is a corner-sectioned view of the axial pump assembly of FIG. 2A in an extended position.
Figure 2B:
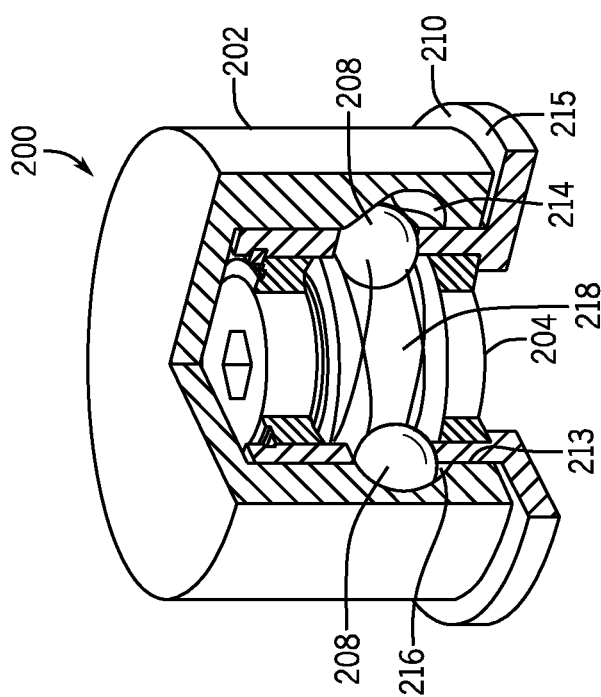
FIG. 2B is a corner-sectioned view of the axial pump assembly of FIG. 2A in a retracted position.
Figure 2D:
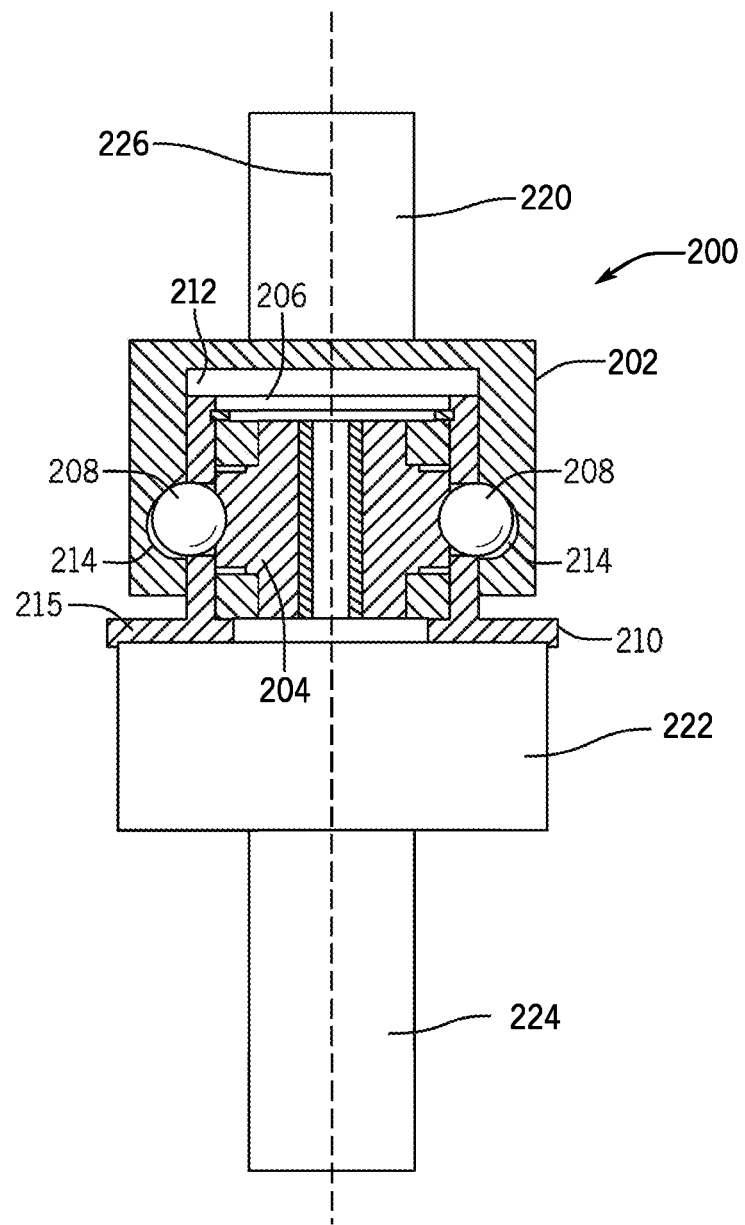
FIG. 2D is a cross-sectional side view of the axial pump assembly of FIG. 2A operatively coupled to a pump piston and a gearbox.

FIG. 2A illustrates another embodiment of an axial pump assembly 200 that, similar to the axial pump assembly 100 shown in FIGS. 1A-E, uses radial movement of ball elements 208 to drive a pump piston 220 (see, for example, FIG. 2D). In particular, as shown in FIG. 2A, the axial pump assembly 200 includes a reciprocating block 202, a sun driver 204, a pair of bearings 206, ball elements 208, a base 210, and a retaining ring 212. A compression spring is not shown in FIG. 2A, since retraction of the axial pump assembly 200 can be achieved without the use of a compression spring.

The ball elements 208 and the base 210 can take the same or similar forms to the ball elements 108 and the base 110 of the axial pump assembly 100 of FIG. 1A, respectively. Although the ball elements 208 are shown to include four ball elements 208, more or less ball elements 208 are possible as well. For example, two ball elements 208 can be used.

The reciprocating block 202 includes four ramped radial channels 214, 216 that extend radially outward from an inner circumferential surface 213 of the reciprocating block 202. Each channel can take the form of a through-hole or a blind hole. Within examples, two of the ramped radial channels 214—namely, a first pair of ramped radial channels 214 that are positioned radially opposite each other—can be ramped downward (i.e., toward the base 210, rather than toward a top surface of the reciprocating block 202), whereas the other two of the ramped radial channels 216—namely, a second pair of ramped radial channels 216 that are positioned radially opposite each other—can be ramped upward (i.e., toward a top surface of the reciprocating block 202). In some example embodiments where only two ball elements 208 are used, the reciprocating block 202 might include two ramped radial channels 214 that are positioned opposite each other, each of which might be ramped downward.

The sun driver 204 is a partially cylindrical-shaped element that functions as a rotational input and can be operatively coupled (e.g., pressed) to a shaft 224 (see, for example, FIG. 2D) of a motor of the hydraulic tool through a bottom of the base 210. The sun driver 204 can be coupled directly to the shaft 224 or by way of a gearbox. Further, the sun driver 204 can include a cam groove 218 (i.e., a race or track) in which the ball elements 208 roll. As such, the sun driver 204 can act as a cam. In some examples, the cam groove 218 can be sinusoidal-shaped or shaped in some other manner that coordinates the timing of the movement of the ball elements 208—namely, so that two of the ball elements 208 that are positioned radially opposite each other move radially outward at substantially the same time as the other two of the ball elements 208 that are positioned radially opposite each other retract radially inward. In alternative embodiments, other groove designs and ramping arrangements for the radial channels are possible as well to achieve the same desired reciprocating movement up and down. The sun driver 204 and its cam groove 218 drive movement of the ball elements 208, but a geared driver and planetary elements are not used for speed reduction. Thus, speed reduction mechanisms that are external to the axial pump assembly 200 might be required.

The pair of bearings 206 can be configured to support cam forces. More or less bearings 206 could be used for the same purpose in alternative embodiments. The retaining ring 212 can be configured to hold the pair of bearings 206 axially within the base 210.

In operation, the motor rotates the sun driver 204, pushing two of the ball elements 208 (i.e., two radially opposing ball elements) radially outward into the first pair of ramped radial channels 214 of the reciprocating block 202 and against the ramped surfaces within the channels. This pushes the reciprocating block 202 upwards in a direction substantially parallel to the common axis 226 and away from a peripheral flange 215 of the base 210. At substantially the same time as two of the ball elements 208 are being pushed radially outward as part of this motion, the other two of the ball elements 208 (i.e., the other two radially opposing ball elements) retract radially inward through the second pair of ramped radial channels 216 of the reciprocating block 202 and toward the sun driver 204. This motion can thus push the pump piston 220 upward. Following this motion, the two ball elements 208 that were pushed radially outward then retract inward and, at substantially the same time, the two ball elements 208 that were retracted radially inward are then pushed radially outward, bringing the reciprocating block 202 downwards.

FIG. 2B is a corner-sectioned view of the axial pump assembly of FIG. 2A in a retracted position in which the reciprocating block 202 is in a downward position. FIG. 2C is a corner-sectioned view of the axial pump assembly of FIG. 2A in an extended position in which the reciprocating block 202 is in an upward position.

FIG. 2D is a cross-sectional side view of the axial pump assembly 200 where the axial pump assembly 200 is operatively coupled to a pump piston 220 and a gearbox 222. FIG. 2D also depicts a motor shaft 224 that is operatively coupled to the axial pump assembly 200 (i.e., to the sun driver 204) by way of the gearbox 222. The gearbox 222 can also be coupled to the base 210 of the axial pump assembly 200. Further, FIG. 2D depicts the axis 226 about which the axial pump assembly 200, the pump piston 220, and the motor shaft 224 are arranged.

An advantage of the axial pump assembly 200 is that it uses one set of cam follower elements (i.e., ball elements 208 of FIG. 2A) to drive motion that is both perpendicular to the axis of the motor shaft 224 (i.e., axis 226)—namely, the radial movement of the ball elements 208—and also to drive reciprocating motion that is in line with axis 226 (i.e., motion of the reciprocating block 202 of FIG. 2A and the pump piston 220 of FIG. 2D). Another advantage of the axial pump assembly 200 is that the cam groove 218 of the sun driver 204 enables synchronization of the perpendicular and reciprocating motions within a single compact system. Further, another advantage of the axial pump assembly 200 is that the arrangement of the axial pump assembly 200 enables the motor shaft 224 to be coaxial to the line of action of the pump piston 220, which can help provide stable motion of the pump piston 220 during operation of the hydraulic tool, as well as reduce the space taken up by the transmission end of the hydraulic tool. Yet another advantage of the axial pump assembly 200 is that it has automatic retraction without the need for a compressions spring.

In some embodiments of the axial pump assembly 200, components of the axial pump assembly 200 could be configured to reverse the relationship between the motion of the ball elements 208 and the motion of the reciprocating block 202. In particular, the axial pump assembly 200 could be configured so that movement (i.e., retraction) of the ball elements 208 radially inward extends the reciprocating block 202 and movement of the ball elements 208 radially outward retracts the reciprocating block 202. To facilitate this, the cam feature of the axial pump assembly 200 could be external to the reciprocating block 202.

Figure 3A:
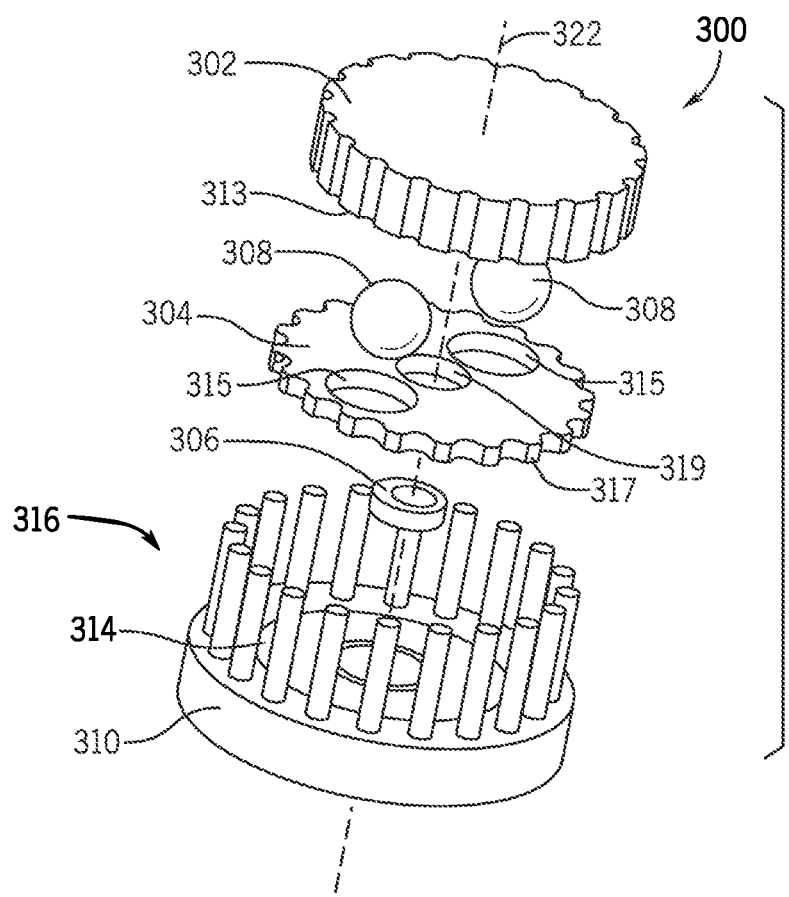
FIG. 3A is an exploded view of an axial pump assembly according to another embodiment of the invention.
Figure 3B:
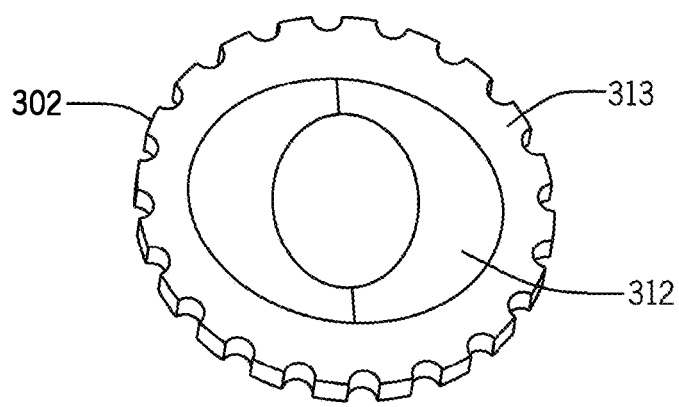
FIG. 3B is a perspective view of a bottom of a reciprocating disk of the axial pump assembly of FIG. 3A.
Figure 3D:
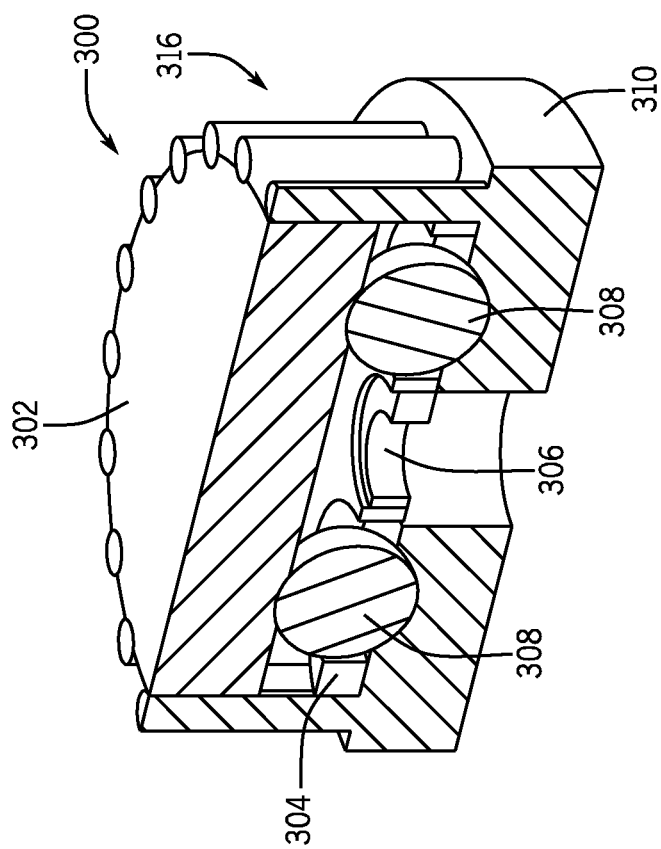
FIG. 3D is a cross-sectional view of the axial pump assembly of FIG. 3A in an extended position.
Figure 3C:
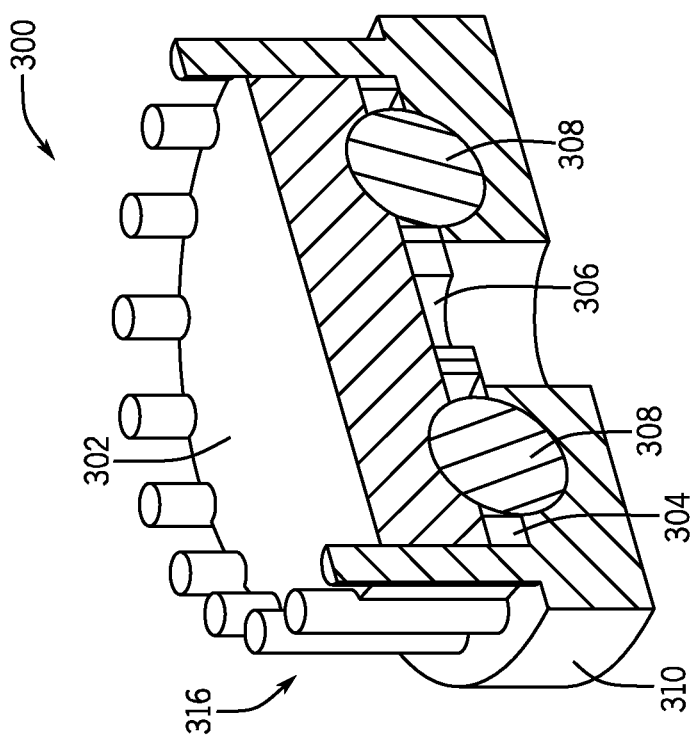
FIG. 3C is a cross-sectional view of the axial pump assembly of FIG. 3A in a retracted position.
Figure 3E:
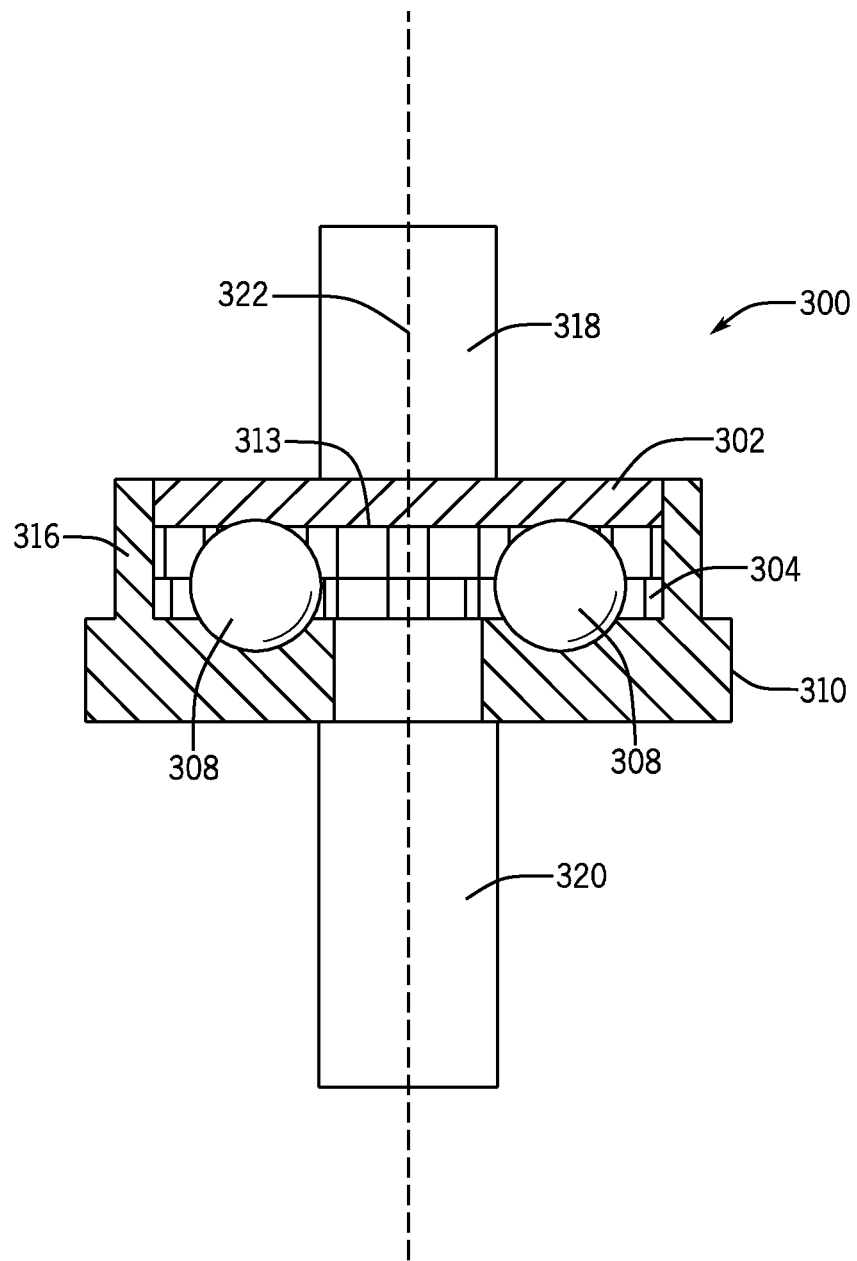
FIG. 3E is a cross-sectional side view of the axial pump assembly of FIG. 3A operatively coupled to a pump piston and a motor shaft.

FIG. 3A illustrates another embodiment of an axial pump assembly 300 for driving motion of a pump piston 318 (see, for example, FIG. 3E). The axial pump assembly 300 includes a reciprocating disk 302, a cycloidal disk 304, an eccentric bearing 306, a pair of ball elements 308, and a base 310. In some embodiments, a compression spring (not shown) or other component can be used to bias the reciprocating disk 302 in a direction toward the pair of ball elements 308 and also to help hold the axial pump assembly 300 together. Further, in some embodiments, additional components not shown in FIG. 3A might be included to improve and maintain stability of the pair of ball elements 308.

As shown in FIG. 3B, the reciprocating disk 302 can include a first annular cam groove 312 disposed in a bottom surface 313 of the reciprocating disk 302. The pair of ball elements 308 can roll in the first annular cam groove 312. In some examples, the first annular cam groove 312 can be shaped to receive a portion of the pair of ball elements 308. Further, the first annular cam groove 312 can be tapered so that the deepest portions of the first annular cam groove 312 contact the pair of ball elements 308 at substantially the same time, causing the reciprocating disk 302 to be in a retracted position. Still further, the first annular cam groove 312 can be tapered so that the shallowest portions of the first annular cam groove 312 contact the pair of ball elements 308 at substantially the same time, causing the reciprocating disk 302 to be in an extended position. The retracted position is shown in the cross-sectional view of the axial pump assembly 300 of FIG. 3C. The extended position is shown in the cross-sectional view of the axial pump assembly 300 of FIG. 3D.

Referring back to FIG. 3A, the cycloidal disk 304 functions as a rotational input and can be operatively coupled to a shaft 320 (see, for example, FIG. 3E) of the motor of the hydraulic tool through a bottom of the base 310. For example, the cycloidal disk 304 can be coupled to the shaft 320 by way of the shaft 320 being pressed to the eccentric bearing 306. Additionally, the cycloidal disk 304 can include a pair of through-holes 315 configured to maintain the pair of ball elements 308 in the first annular cam groove 312, as well as in the second annular cam groove 314 of the base 310, and also to rotationally push the pair of ball elements 308 during operation. Further, the cycloidal disk 304 can have a geared periphery 317 for meshing with base pins 316 of the base 310. As so arranged, the cycloidal disk 304 can provide speed reduction. The cycloidal disk 304 can also include a through-hole 319 configured to encircle the eccentric bearing 306. The eccentric bearing 306 can be configured to generate rotational eccentricity that drives cycloidal transmission. The pair of ball elements 308 can be configured to act as cam followers that transmit axial forces between the reciprocating disk 302 and the base 310.

The base 310 can be configured to act as housing for other components of the axial pump assembly 300 and to provide a reaction force to drive the cycloidal disk 304. As noted above, the base 310 can include the second annular cam groove 314 which, unlike the first annular cam groove 312 might have a uniform depth.

In operation, rotation of the shaft rotates the cycloidal disk 304, thus rotationally pushing the pair of ball elements 308. The movement of the pair of ball elements 308 in the first annular cam groove 312 thus causes the reciprocating disk 302 to move up and down between the retracted position and the extended position.

FIG. 3E is a cross-sectional side view of the axial pump assembly 300 where the axial pump assembly 300 is operatively coupled to the pump piston 318 and the motor shaft 320. As mentioned above, the cycloidal disk 304 of the axial pump assembly 300 can be operatively coupled to the motor shaft 320. Although a compression spring is not depicted in FIG. 3E, the block representing the pump piston 318 can represent both the compression spring and the pump piston 318. Further, FIG. 3E depicts an axis 322 about which the axial pump assembly 300, the pump piston 318, and the motor shaft 320 are arranged.

An advantage of the axial pump assembly 300 is that it combines mechanisms for reciprocation and speed reduction into a single compact system requiring less parts for operation than in some existing systems. This is accomplished by using cam followers (i.e., ball elements 308 of FIG. 3A) that interact with a cam of a reciprocating element (i.e., the first annular cam groove 312 of reciprocating disk 302). Further, another advantage of the axial pump assembly 300 is that the arrangement of the axial pump assembly 300 enables the motor shaft 320 to be coaxial to the line of action of the pump piston 318, which can help reduce the space taken up by the transmission end of the hydraulic tool.

Figure 4A:
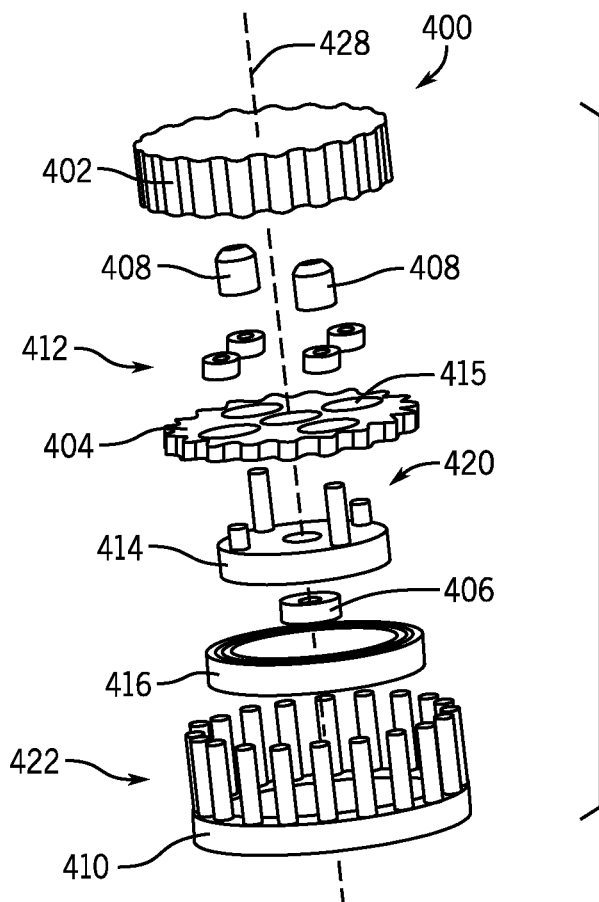
FIG. 4A is an exploded view of an axial pump assembly according to another embodiment of the invention.
Figure 4B:
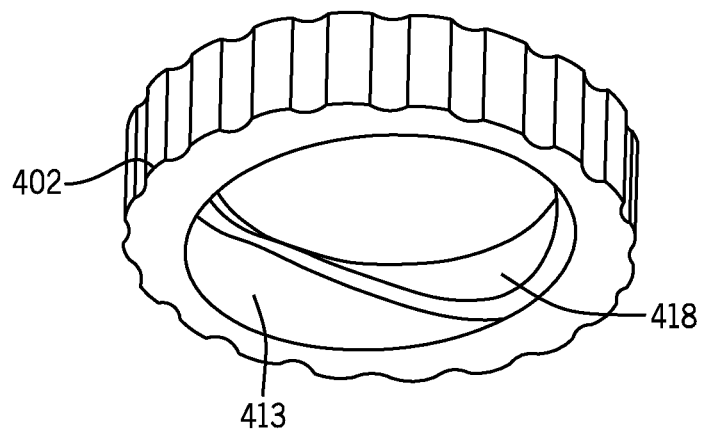
FIG. 4B is a perspective view of a bottom of a reciprocating disk of the axial pump assembly of FIG. 4A.
Figure 4C:
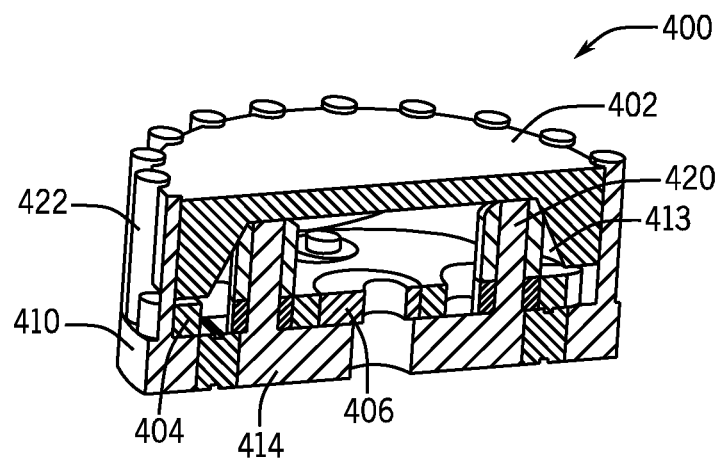
FIG. 4C is a cross-sectional view of the axial pump assembly of FIG. 4A in a retracted position.
Figure 4D:
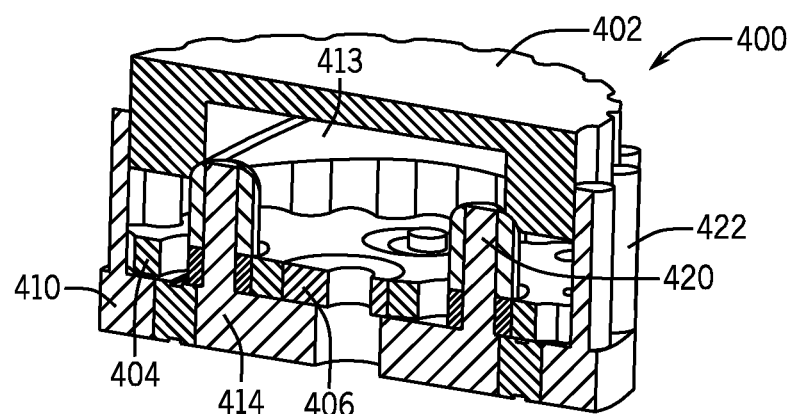
FIG. 4D is a cross-sectional view of the axial pump assembly of FIG. 4A in an extended position.
Figure 4E:
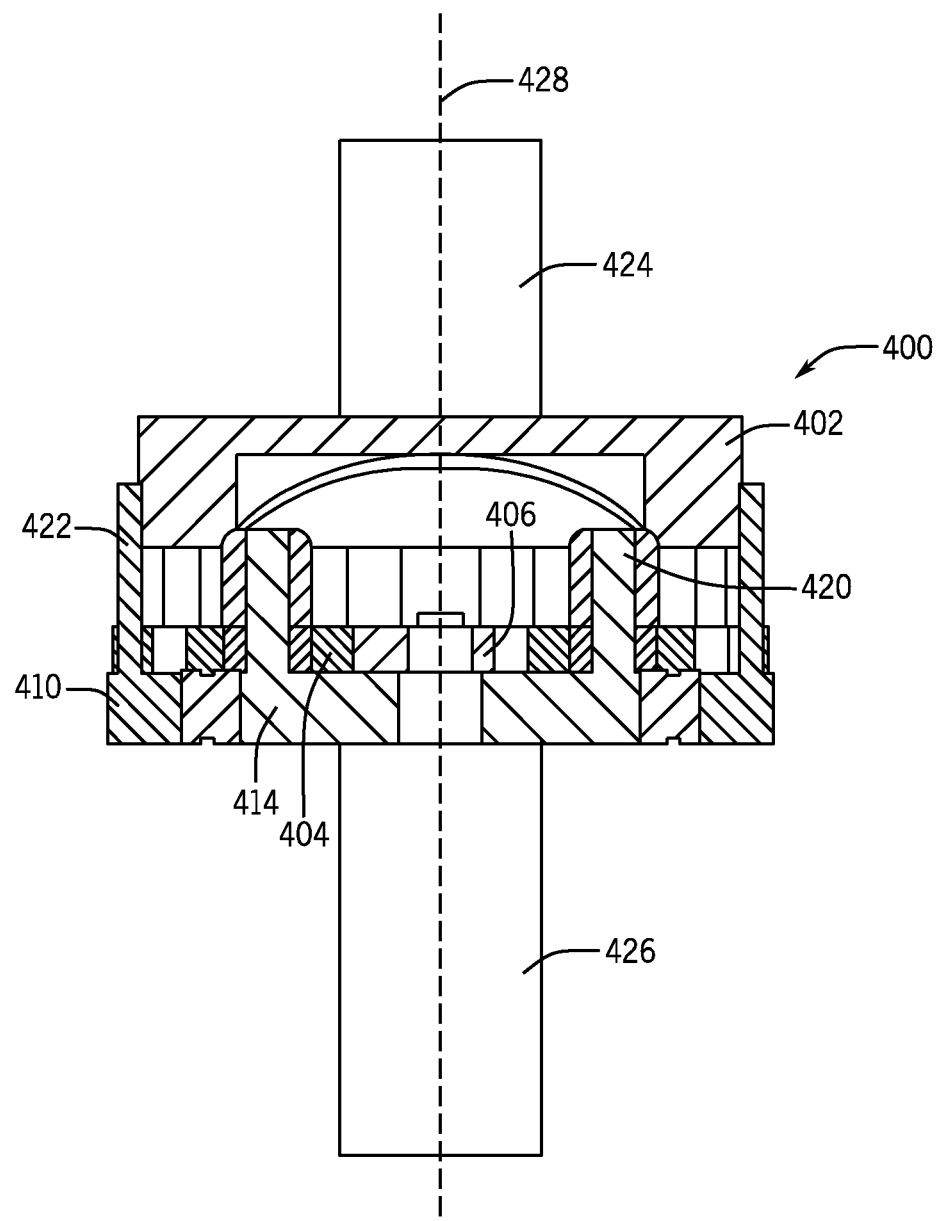
FIG. 4E is a cross-sectional side view of the axial pump assembly of FIG. 4A operatively coupled to a pump piston and a motor shaft.

FIG. 4A illustrates another embodiment of an axial pump assembly 400 for driving motion of a pump piston 424 (see, for example, FIG. 4E). In particular, the axial pump assembly 400 uses a tangential cam to create axial motion. The axial pump assembly 400 includes a reciprocating disk 402, a cycloidal disk 404, an eccentric bushing 406, a pair of cam roller bushings 408, a base 410, four second-stage bushings 412, a second-stage disk 414, and a bearing 416. In some embodiments, a compression spring (not shown in FIG. 4A) or other component can be used to bias the reciprocating disk 402 in a direction toward the pair of cam roller bushings 408 and also to help hold the axial pump assembly 400 together.

As shown in FIG. 4B, the reciprocating disk 402 can include a cam groove 418 disposed on or in an inner circumferential surface 413 of the reciprocating disk 402. By way of the cam groove 418, the reciprocating disk 402 interacts axially with the pair of cam roller bushings 408 to create reciprocating motion of the reciprocating disk 402 between a retracted position and an extended position. The retracted position is shown in the cross-sectional view of the axial pump assembly 400 of FIG. 4C. The extended position is shown in the cross-sectional view of the axial pump assembly 400 of FIG. 4D.

Referring back to FIG. 4A, the cycloidal disk 404 functions as a rotational input and can be operatively coupled to a shaft 426 (see, for example, FIG. 4E) of the motor (not shown) of the hydraulic tool through a bottom of the base 410. For example, the cycloidal disk 404 can be coupled to the shaft 426 by way of the shaft 426 being pressed to the eccentric bushing 406. The cycloidal disk 404 can be positioned between the reciprocating disk 402 and the second-stage disk 414. Additionally, the cycloidal disk 404 can include five through-holes 415, four of which are configured to receive the four second-stage bushings 412 and four disk pins 420 protruding from the second-stage disk 414, and one of which is configured for receiving the eccentric bushing 406. The eccentric bushing 406 can be configured to generate rotational eccentricity that drives cycloidal transmission. Further, the cycloidal disk 404 can have a geared periphery for meshing with base pins 422 of the base 410 and providing speed reduction.

As so arranged, the cycloidal disk 404, in operation, can convert eccentric motion to rotational motion—namely, rotational motion that drives rotation of the second-stage disk 414. Each cam roller bushing of the pair of cam roller bushings 408 can include a through-hole, a blind hole, or other manner of coupling the cam roller bushing 408 to one of the four disk pins 420. Thus, in operation, the rotational motion of the second-stage disk 414 is translated to the pair of cam roller bushings 408, which in turn interact axially with the cam groove 418 of the reciprocating disk 402, causing the reciprocating disk 402 to move up and down between the retracted position and the extended position.

Furthermore, the four second-stage bushings 412 can be slid around or otherwise coupled to the four disk pins 420 and are configured to reduce frictional resistance between the four disk pins 420 and the cycloidal disk 404. Similarly, the bearing 416 can encircle the second-stage disk 414 and is configured to reduce frictional resistance between the base 410 and the second-stage disk 414. The base 410 can be configured to act as housing for other components of the axial pump assembly 400 and to provide a reaction force to drive the cycloidal disk 404.

FIG. 4E is a cross-sectional side view of the axial pump assembly 400 where the axial pump assembly 400 is operatively coupled to the pump piston 424 and the motor shaft 426. As mentioned above, the cycloidal disk 404 of the axial pump assembly 400 can be operatively coupled to the motor shaft 426. Although a compression spring is not depicted in FIG. 4E, the block representing the pump piston 424 can represent both the compression spring and the pump piston 424. Further, FIG. 4E depicts an axis 428 about which the axial pump assembly 400, the pump piston 424, and the motor shaft 426 are arranged.

An advantage of the axial pump assembly 400 is that it combines mechanisms for reciprocation and speed reduction into a single system. This is accomplished by combining a cam system with a cycloidal reducer. Further, another advantage of the axial pump assembly 400 is that the arrangement of the axial pump assembly 400 enables the motor shaft 426 to be coaxial to the line of action of the pump piston 424, which can help reduce the space taken up by the transmission end of the hydraulic tool and can also help maintain stable motion.

In alternative embodiments, a planetary gear system could be incorporated with the axial pump assembly 400. In other alternative embodiments, more or less disk pins, base pins, and second-stage bushings could be used. For example, in one embodiment, no second-stage bushings might be used.

Figure 5A:
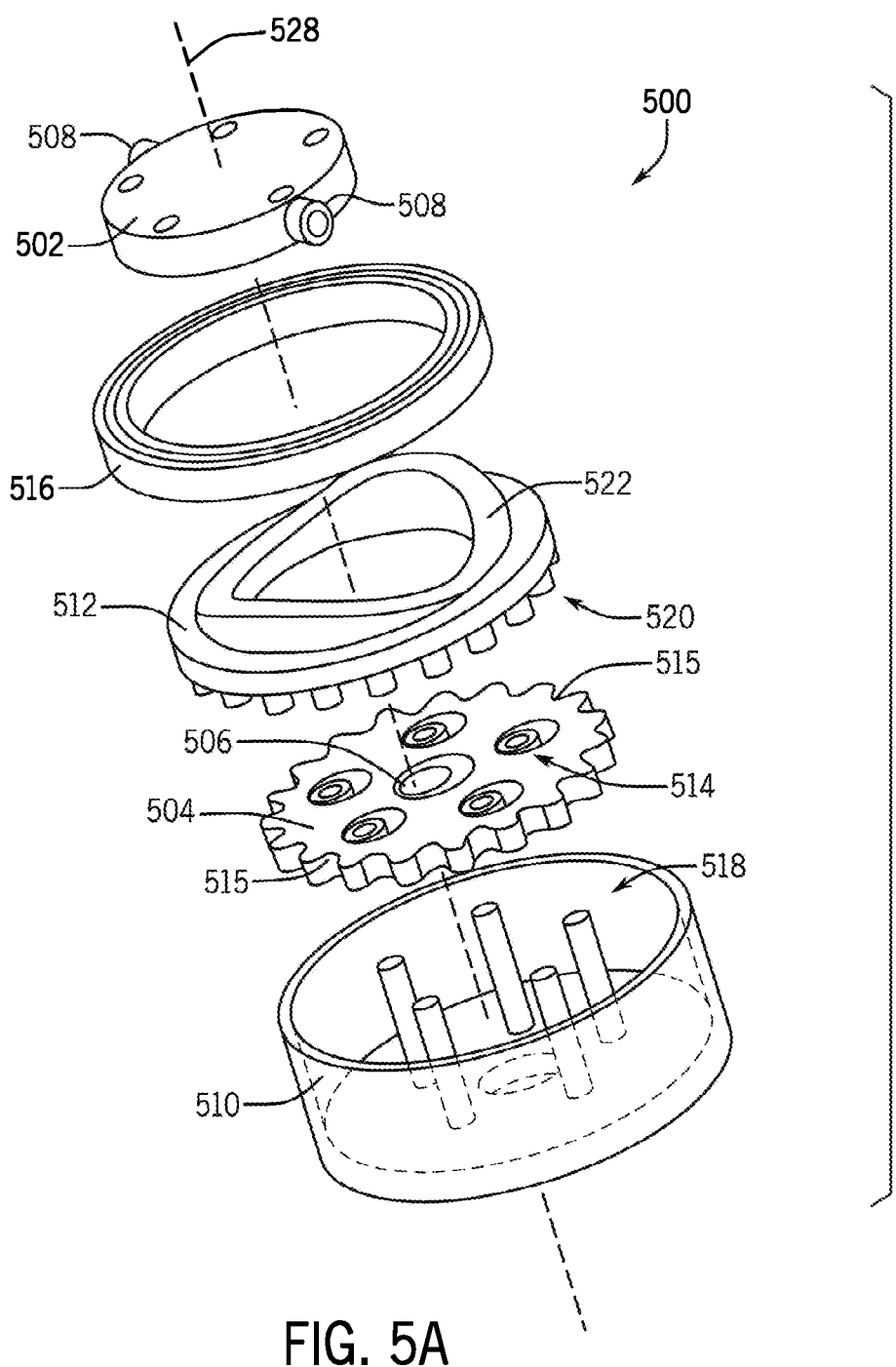
FIG. 5A is an exploded view of an axial pump assembly according to another embodiment of the invention.
Figure 5B:
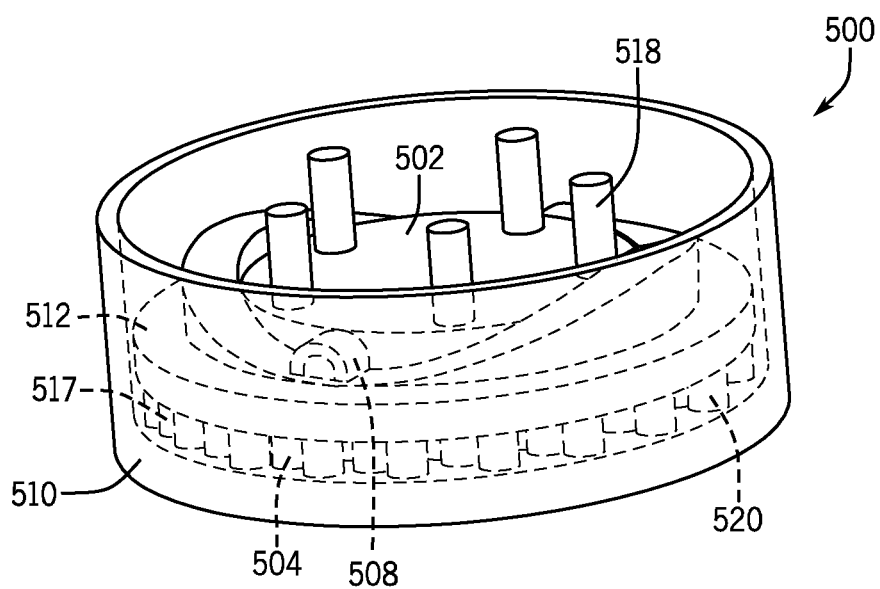
FIG. 5B is a perspective view of the axial pump assembly of FIG. 5A in a retracted position.
Figure 5C:
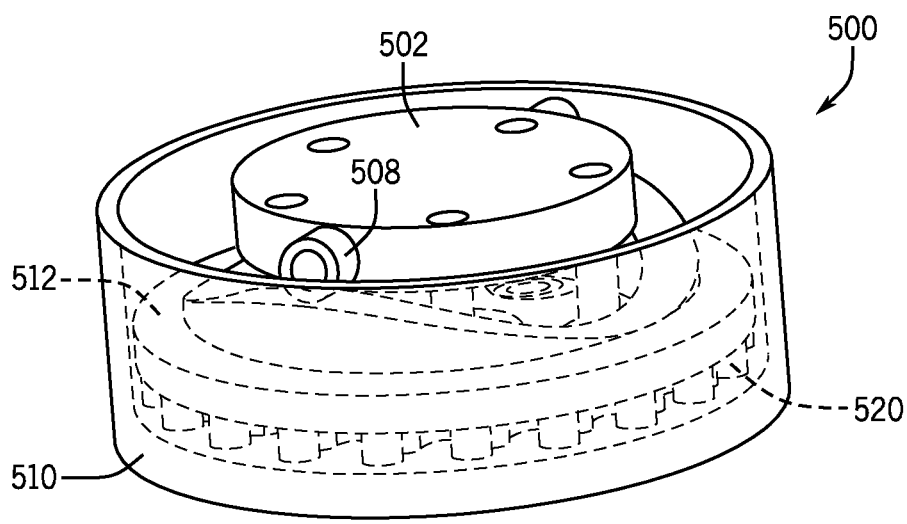
FIG. 5C is a perspective view of the axial pump assembly of FIG. 5A in an extended position.
Figure 5D:
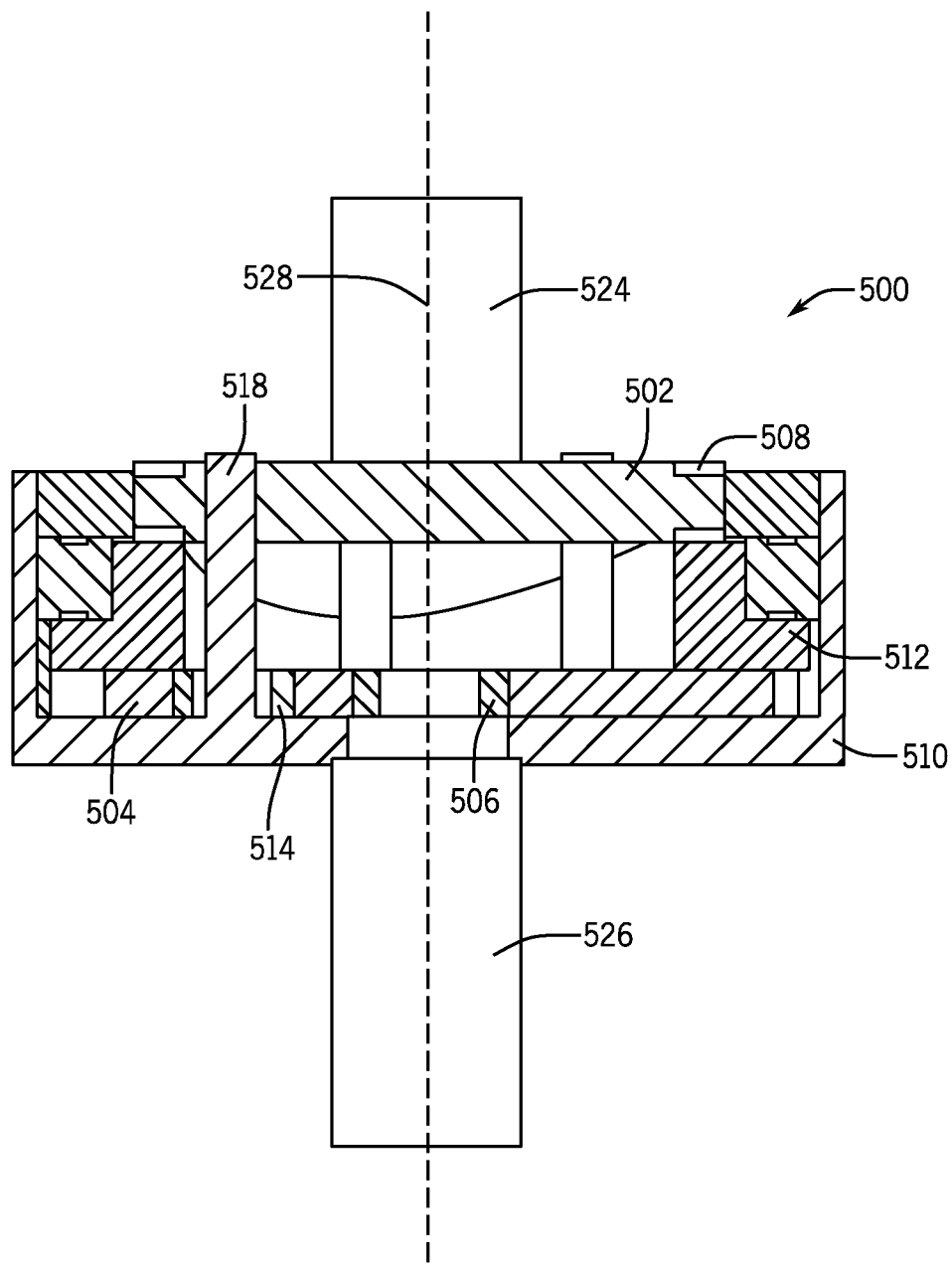
FIG. 5D is a cross-sectional side view of the axial pump assembly of FIG. 5A operatively coupled to a pump piston and a motor shaft.

FIG. 5A illustrates an exploded view of another embodiment of an axial pump assembly 500 for driving motion of a pump piston 524 (See, for example FIG. 5D). In particular, the axial pump assembly 500 uses an axial cam to create motion. The axial pump assembly 500 includes a reciprocating plate 502, a cycloidal disk 504, an eccentric bushing 506, a pair of cam follower bushings 508, a base 510, a ring element 512, five second-stage bushings 514, and a bearing 516. In some embodiments, a compression spring (not shown in FIG. 5A) or other component can be used to bias the reciprocating plate 502 in a retracted position and also to help hold the axial pump assembly 500 together. The reciprocating plate 502 can include two opposing side members around which the pair of cam follower bushings 508 are positioned.

The cycloidal disk 504 functions as a rotational input and can be operatively coupled to a shaft 526 (see, for example, FIG. 5D) of the motor (not shown) of the hydraulic tool through a bottom of the base 510. For example, the cycloidal disk 504 can be coupled to the shaft by way of the shaft being pressed to the eccentric bushing 506. The cycloidal disk 504 can be mounted to the base 510 by way of five base pins 518 protruding from the base 510 and can be mounted so that the cycloidal disk 504 is positioned between the reciprocating plate 502 and the bottom of the base 510. Additionally, the cycloidal disk 504 can include six through-holes 515, five of which are configured to receive the five second-stage bushings 514 and the five base pins 518, and one of which is configured for receiving the eccentric bushing 506. The eccentric bushing 506 can be configured to generate rotational eccentricity that drives cycloidal transmission. Further, the cycloidal disk 504 can have a geared periphery 517 for meshing with outer pins 520 of the ring element 512.

In addition, the ring element 512 can include an annular cam track 522 protruding from the ring element 512 and along which the pair of cam follower bushings 508 roll to produce reciprocating motion. The annular cam track 522 can be tapered such that the deepest portions of the annular cam track 522 contact the pair of cam follower bushings 508 at substantially the same time, thereby causing the reciprocating plate 502 to be in a retracted position. Further, the annular cam track 522 can be tapered such that the shallowest portions of the annular cam track 522 contact the pair of cam follower bushings 508 at substantially the same time, causing the reciprocating plate 502 to be in an extended position. The retracted position is shown in the perspective view of the axial pump assembly 500 of FIG. 5B. The extended position is shown in the perspective view of the axial pump assembly 500 of FIG. 5C.

Through the meshing of the outer pins 520 with the geared periphery of the cycloidal disk 504, the ring element 512 receives rotational motion from the cycloidal disk 504. This rotational motion is then translated to reciprocating motion of the reciprocating plate 502 between the retracted position and the extended position by way of the pair of cam follower bushings 508 rolling on the annular cam track 522.

Furthermore, the five second-stage bushings 514 can be slid around or otherwise coupled to the five base pins 518 and are configured to reduce frictional resistance between the five base pins 518 and the cycloidal disk 504. Similarly, the bearing 516 can encircle the ring element 512 and be positioned between the ring element 512 and the side wall of the base 510. The bearing 516 is configured to reduce frictional resistance between the base 510 and the ring element 512. For simplicity, the bearing 516 is not shown in FIGS. 5B and 5C. Moreover, the base 510 can be configured to act as housing for other components of the axial pump assembly 500 and to provide a reaction force to drive the cycloidal disk 504 and the ring element 512.

As so arranged, the cycloidal disk 504, in operation, can convert eccentric motion to rotational motion—namely, motion that drives rotation of the ring element 512. In particular, rotation of the motor shaft causes the cycloidal disk 504 to oscillate eccentrically, back and forth in a circular motion. Reaction forces between the cycloidal disk 504 and the five second-stage bushings 514 (or, in an embodiment where no bushings a present, then between the cycloidal disk 504 and the five base pins 518) cause the geared periphery of the cycloidal disk 504 to push on the outer pins 520, driving rotation of the ring element 512 and, in turn, reciprocating motion of the reciprocating plate 502.

FIG. 5D is a cross-sectional side view of the axial pump assembly 500 where the axial pump assembly 500 is operatively coupled to the pump piston 524 and the motor shaft 526. As mentioned above, the cycloidal disk 504 of the axial pump assembly 500 can be operatively coupled to the motor shaft 526. Although a compression spring is not depicted in FIG. 5D, the block representing the pump piston 524 can represent both the compression spring and the pump piston 524. Further, FIG. 5D depicts an axis 528 about which the axial pump assembly 500, the pump piston 524, and the motor shaft 526 are arranged.

An advantage of the axial pump assembly 500 is that it combines mechanisms for reciprocation and speed reduction into a single system. This is accomplished by combining a cam system with a cycloidal reducer. Further, another advantage of the axial pump assembly 500 is that the arrangement of the axial pump assembly 500 enables the motor shaft 526 to be coaxial to the line of action of the pump piston 524, which can help reduce the space taken up by the transmission end of the hydraulic tool and can also help maintain stable motion. The axial pump assembly 500 also differs from some existing arrangements in that the cycloidal disk 504 oscillates eccentrically instead of rotating.

In alternative embodiments, a planetary gear system could be incorporated with the axial pump assembly 500. In other alternative embodiments, more or less disk pins, base pins, and second-stage bushings could be used. For example, in one embodiment, no second-stage bushings might be used.

FIGS. 6A-6C and 7A-7C relate to another form that an axial pump assembly might take—particularly, where reciprocating motion is generated by a pump piston that is transverse to other components of the axial pump assembly and perpendicular to an axis about which a shaft of the motor (and thus, the cycloidal disk) rotates. Similar to the embodiments described above, each of the example axial pump assemblies shown in FIGS. 6A-6C and 7A-7C are compact and combine speed reduction and reciprocating motion in a single mechanism.

Figure 6A:
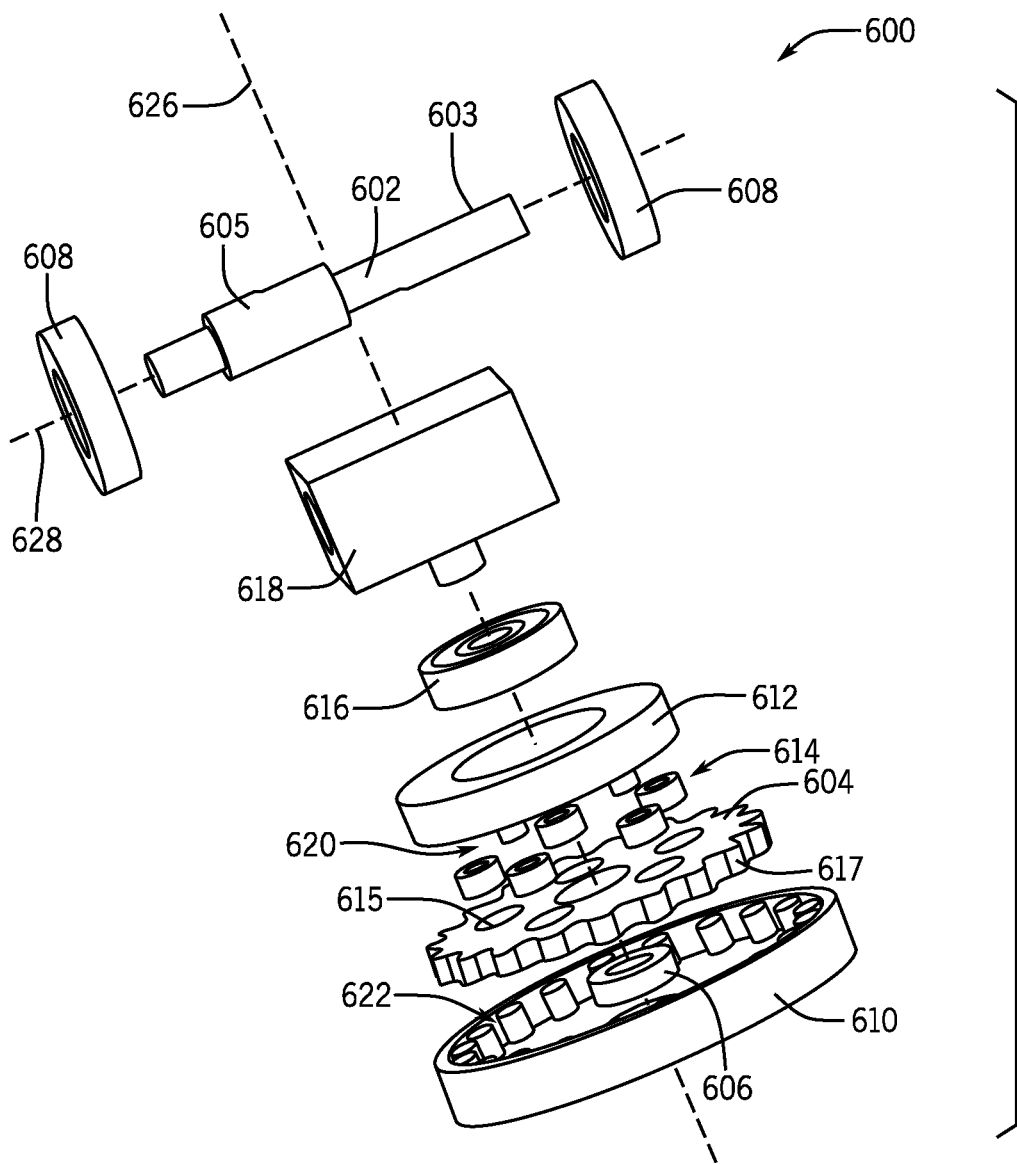
FIG. 6A is an exploded view of an axial pump assembly according to another embodiment of the invention.

FIG. 6A illustrates an exploded view of another embodiment of an axial pump assembly 600 for driving motion of a pump piston 602. In addition to the pump piston 602, the axial pump assembly 600 includes a cycloidal disk 604, an eccentric bearing 606, a pair of cam follower bearings 608, a base 610, a second-stage cam 612 operatively coupled to the cycloidal disk 604, five second-stage bushings 614, and a load supporting bearing 616. Also shown is a manifold 618, which can house hydraulic components (e.g., check valves) and through which hydraulic fluid can be pumped. Although FIG. 6A shows the manifold 618, the manifold 618 might be considered to not be a component of the axial pump assembly 600 in some embodiments.

The pump piston 602 is bi-diametral and transverse, comprising a first section 603 having a first diameter and a second section 605 having a second diameter that is larger than the first diameter. The two diameters enable hydraulic fluid to be pumped through the manifold 618. The pump piston 602 is arranged partially within the manifold 618.

The cycloidal disk 604 functions as a rotational input and can be operatively coupled to a shaft 624 (see, for example, FIG. 6D) of the motor (not shown) of the hydraulic tool through a bottom of the base 610. For example, the cycloidal disk 604 can be coupled to the shaft by way of the shaft being pressed to the eccentric bearing 606. The cycloidal disk 604 can be positioned between the second-stage cam 612 and the bottom of the base 610. Additionally, the cycloidal disk 604 can include six through-holes 615, five of which are configured to receive the five second-stage bushings 614 and five cam pins 620 protruding from the bottom of the second-stage cam 612, and one of which is configured for receiving the eccentric bearing 606. The eccentric bearing 606 can be configured to generate rotational eccentricity that drives cycloidal transmission. Further, the cycloidal disk 604 can have a geared periphery 617 for meshing with base pins 622 of the base 610. As so arranged, the cycloidal disk 604, in operation, provides speed reduction and can convert eccentric motion to rotational motion—namely, rotational motion that drives rotation of the second-stage cam 612.

Figure 6B:
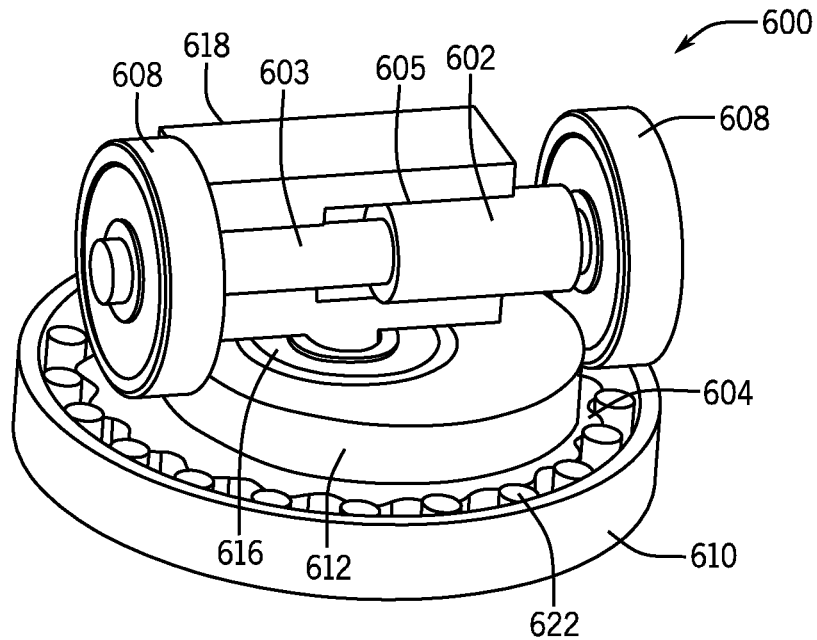
FIG. 6B is a perspective view of the axial pump assembly of FIG. 6A in a retracted position.
Figure 6C:
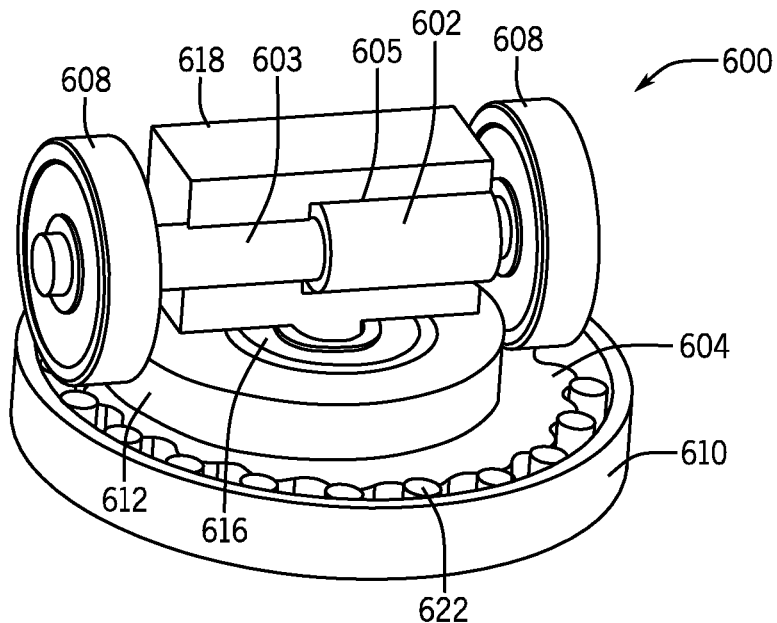
FIG. 6C is a perspective view of the axial pump assembly of FIG. 6A in an extended position.

The pair of cam follower bearings 608 are coupled to the ends of the pump piston 602. Rotational motion of the second-stage cam 612 pushes the pair of cam follower bearings 608, which moves the pump piston 602 back and forth between a retracted position and an extended position. The retracted position is shown in the perspective view of the axial pump assembly 600 of FIG. 6B. The extended position is shown in the perspective view of the axial pump assembly 600 of FIG. 6C. In FIGS. 6B and 6C, the manifold 618 is sectioned in order to show the position of the pump piston 602.

Furthermore, the five second-stage bushings 614 can be slid around or otherwise coupled to the five cam pins 620 and are configured to transmit rotational force from the cycloidal disk 604 to the second-stage cam 612. In addition, the load supporting bearing 616 can be slid around or otherwise coupled to the manifold 618 and is configured to support loads from the second-stage cam 612.

Figure 6D:
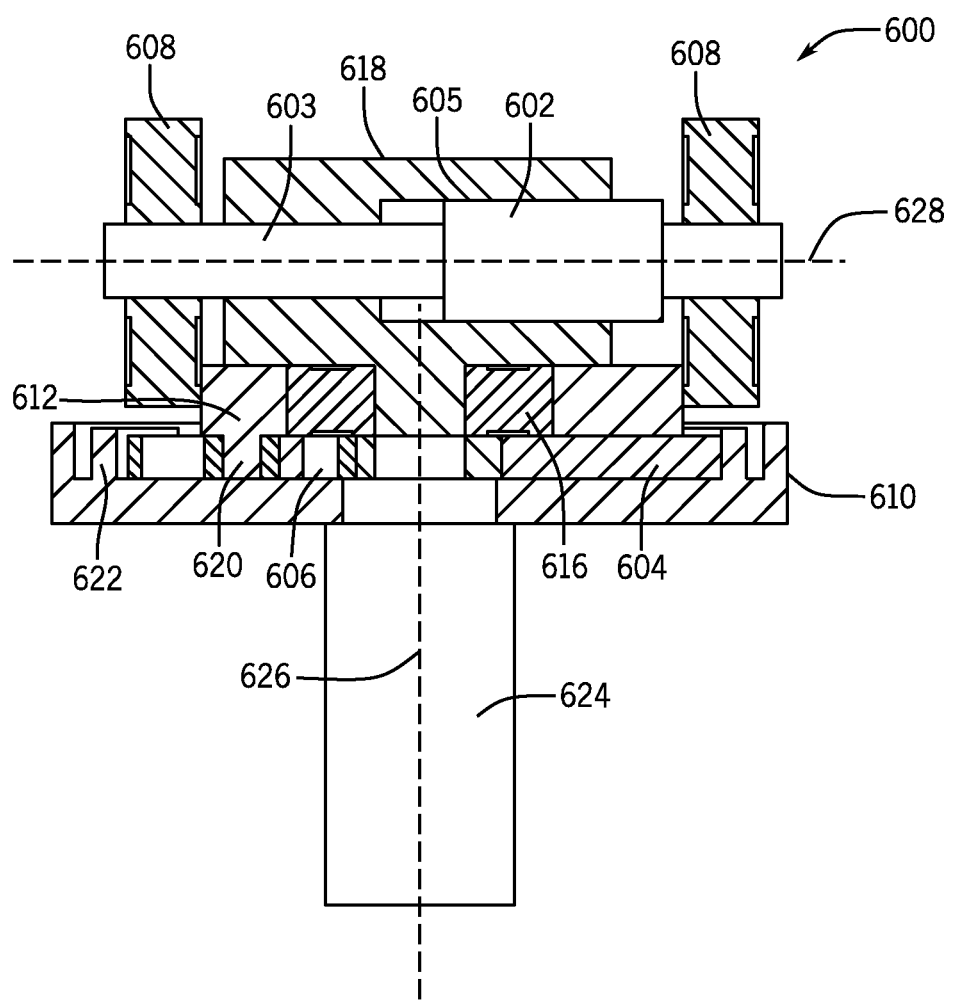
FIG. 6D is a cross-sectional side view of the axial pump assembly of FIG. 6A operatively coupled to a motor shaft.

FIG. 6D is a cross-sectional side view of the axial pump assembly 600 where the axial pump assembly 600 is operatively coupled to the motor shaft 624. As mentioned above, the cycloidal disk 604 of the axial pump assembly 600 can be operatively coupled to the motor shaft 624. Further, FIG. 6D depicts a first axis 626 about which the motor shaft 624 rotates (i.e., the longitudinal axis of the motor shaft 624) and about which the cycloidal disk 604 is arranged. FIG. 6D also depicts a second axis 628 that is substantially perpendicular to the first axis 626 and along which the pump piston 602 moves (i.e., the longitudinal axis of the pump piston 602). In some embodiments, the second axis 628 can be centered on the first axis 626 (e.g., so that the longitudinal axis of the motor shaft 624 and the longitudinal axis of the pump piston 602 substantially intersect).

An advantage of the axial pump assembly 600 is that it combines mechanisms for reciprocation and speed reduction into a compact system. This is accomplished by combining a cam system with a cycloidal disk (i.e., cycloidal disk 604 of FIG. 6A) that also acts as a speed reducer. Further, another advantage of the axial pump assembly 600 is that a return spring is not necessary for reciprocating motion, since the points at which the pair of cam followers 608 of FIG. 6A contact the second-stage cam 612 are offset from the second axis 628. Another advantage of the axial pump assembly 600 is that the cam feature being separate from the cycloidal element allows for smooth interaction but might require a central load supporting bearing. In other embodiments, more or less second-stage bushings could be used. For example, in one embodiment, no second-stage bushings might be used.

FIG. 7A illustrates an exploded view of another embodiment of an axial pump assembly 700 for driving motion of a pump piston 702. In addition to the pump piston 702, the axial pump assembly 700 includes a cycloidal disk 704, an eccentric bearing 706, a pair of cam follower bearings 708, and a base 710. Also shown is a manifold 712, which can house hydraulic components (e.g., check valves) and through which hydraulic fluid can be pumped. Although FIG. 7A shows the manifold 712, the manifold 712 might be considered to not be a component of the axial pump assembly 700 in some embodiments.

The axial pump assembly 700 of FIG. 7A operates similarly to the axial pump assembly 600 of FIG. 6A, except the cycloidal disk 704 is integrated with a second-stage cam (e.g., second stage cam 612 of FIG. 6A). In other words, as opposed to having two separate components—a cycloidal disk and a second-stage cam, the cycloidal disk 704 of FIG. 7A is a single component including a second-stage cam portion 714 and a geared portion 716. The eccentric bearing 706, the pair of cam follower bearings 708, and the base 710 can each be configured the same as their corresponding component described above with respect to FIG. 6A.

Figure 7B:
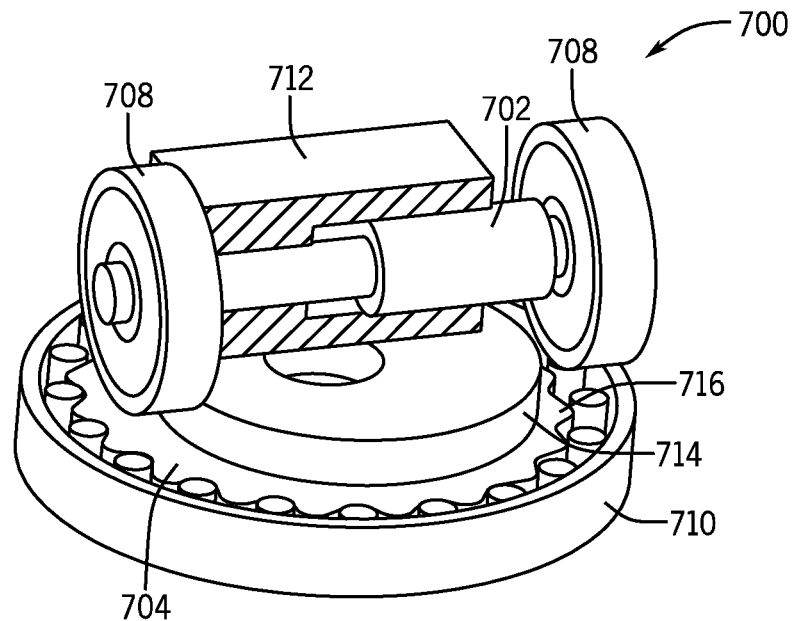
FIG. 7B is a perspective view of the axial pump assembly of FIG. 7A in a retracted position.
Figure 7C:
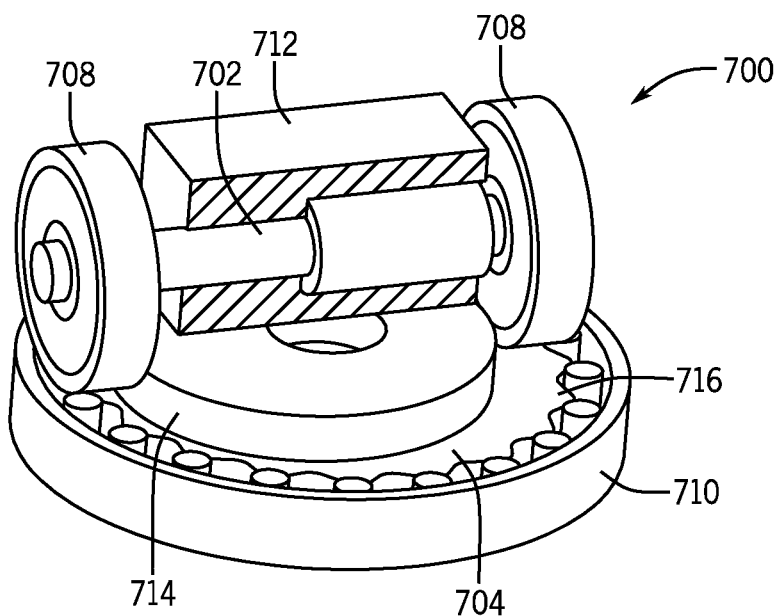
FIG. 7C is a perspective view of the axial pump assembly of FIG. 7A in an extended position.

In operation, rotational motion of the second-stage cam portion 714 of the rotating cycloidal disk 704 pushes the pair of cam follower bearings 708, which moves the pump piston 702 back and forth between a retracted position and an extended position. The retracted position is shown in the perspective view of the axial pump assembly 700 of FIG. 7B. The extended position is shown in the perspective view of the axial pump assembly 700 of FIG. 7C. In FIGS. 7B and 7C, the manifold 712 is sectioned in order to show the position of the pump piston 702.

Figure 7D:
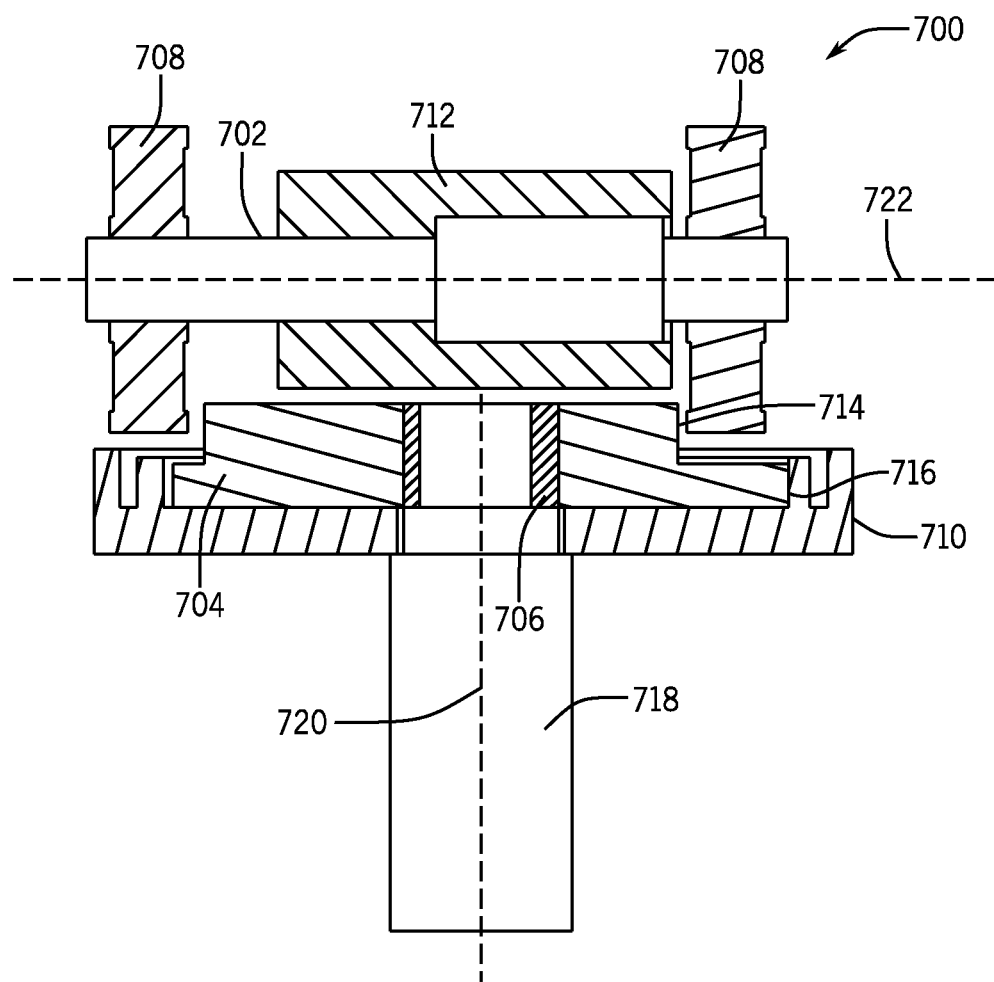
FIG. 7D is a cross-sectional side view of the axial pump assembly of FIG. 7A operatively coupled to a motor shaft.

FIG. 7D is a cross-sectional side view of the axial pump assembly 700 where the axial pump assembly 700 is operatively coupled to a motor shaft 718. As mentioned above, the cycloidal disk 704 of the axial pump assembly 700 can be operatively coupled to the motor shaft 718. Further, FIG. 7D depicts a first axis 720 about which the motor shaft 718 rotates (i.e., the longitudinal axis of the motor shaft 718) and about which the cycloidal disk 704 is arranged. FIG. 7D also depicts a second axis 722 that is substantially perpendicular to the first axis 720 and along which the pump piston 702 moves (i.e., the longitudinal axis of the pump piston 702). In some embodiments, the second axis 722 can be centered on the first axis 720 (e.g., so that the longitudinal axis of the motor shaft 718 and the longitudinal axis of the pump piston 702 substantially intersect).

An advantage of the axial pump assembly 700 is that it combines mechanisms for reciprocation and speed reduction into a compact system requiring less parts for operation than in some existing systems. This is accomplished by combining a cam system with a cycloidal disk (i.e., cycloidal disk 704 of FIG. 7A) that also acts as a speed reducer. Further, another advantage of the axial pump assembly 700 is that a return spring is not necessary for reciprocating motion, since the points at which the pair of cam followers 708 of FIG. 7A contact the second-stage cam portion 714 are offset from the second axis 722. Another advantage of the axial pump assembly 700 is that the cam feature is merged with the cycloidal element, thus eliminating the need for a central load supporting bearing.

By the term "substantially" or "about" used herein, it is meant that the recited characteristic, parameter, value, or geometric planarity need not be achieved exactly, but that deviations or variations, including for example, tolerances, measurement error, measurement accuracy limitations and other factors known to skill in the art, may occur in amounts that do not preclude the effect the characteristic was intended to provide.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. An axial pump assembly for a hydraulic tool, the axial pump assembly comprising: a reciprocating block having ramped radial channels extending radially outward from an inner circumferential surface of the reciprocating block; a sun driver configured to be operatively coupled to a motor shaft; ball elements configured to roll on a race portion, each ball element arranged at least partially within a respective ramped radial channel of the ramped radial channels; and a base at least partially enclosing the sun driver and the ball elements; movement of the ball elements radially outward through the ramped radial channels driving the reciprocating block away from the base, and movement of the ball elements radially inward through the ramped radial channels driving the reciprocating block toward the base; planetary elements having geared portions that mesh with geared portions of the sun driver; wherein the ball elements are configured to roll on the race portion of each planetary element.

2. The axial pump assembly of claim 1, wherein the base includes a geared portion configured to mesh with the planetary elements and provide speed reduction to the axial pump assembly.

3. The axial pump assembly of claim 1, wherein the reciprocating block is configured to be operatively coupled to a pump piston of the hydraulic tool.

4. The axial pump assembly of claim 3, wherein the axial pump assembly is configured to be arranged within the hydraulic tool such that the motor shaft is substantially coaxial with a line of action of the reciprocating block.

5. The axial pump assembly of claim 1, wherein the race portion is a sinusoidal-shaped cam groove formed on the sun driver.

6. The axial pump assembly of claim 1, wherein the ramped radial channels include a first pair of opposing ramped radial channels that are ramped towards the base.

* * * * *